(12) United States Patent
Suh et al.

(10) Patent No.: US 7,295,958 B1
(45) Date of Patent: Nov. 13, 2007

(54) METHOD AND SYSTEM FOR COMPUTER AIDED DESIGN

(75) Inventors: Nam Pyo Suh, Sudbury, MA (US); Jin-Pyung Chung, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 748 days.

(21) Appl. No.: 10/454,325

(22) Filed: Jun. 4, 2003

Related U.S. Application Data

(60) Provisional application No. 60/385,690, filed on Jun. 4, 2002.

(51) Int. Cl.
*G06G 7/48* (2006.01)
*G06F 9/44* (2006.01)

(52) U.S. Cl. .................. 703/7; 703/2; 703/6; 717/108; 707/103 Y

(58) Field of Classification Search .................... 703/2, 703/6, 7; 717/108; 707/103 Y
See application file for complete search history.

(56) References Cited

U.S. PATENT DOCUMENTS

| 6,768,928 B1 * | 7/2004 | Nagasawa et al. ............ 700/98 |
| 7,054,885 B1 * | 5/2006 | Hoffman et al. ........ 707/103 Y |
| 2002/0046394 A1 * | 4/2002 | Do et al. .................... 717/108 |
| 2002/0170042 A1 * | 11/2002 | Do et al. .................... 717/143 |

OTHER PUBLICATIONS

Sung-Hee Do and Nam P. Suh, "Systematic OO Programming with Axiomatic Design". Computer. vol. 32, Issue 10, Oct. 1999. pp. 121-124.*

Lawerence S. Gould, "Building Better Vehicles via Axiomatic Design." Automotive Design and Production. Jun. 2000. http://www.autofieldguide.com/articles/article_print.cfm.*

HighBeam Research. "Axiomatic Design Software, Inc. Wins INDUSTRYWEEK's Technology Of the Year Award for Acclaro™ software." Dec. 1, 1999. http://www.highbeam.com/DocPrint.aspx?DocId=1G1:57872635.*

John Teresko et al. "Axiomatic Design Software Inc., Boston". Industry Week.com. Dec. 6, 1999. http://www.industryweek.com/PrintArticle.aspx?ArticleID=493&SectionID=38.*

"Press Releases —Acclaro Scheduler for Rational Rose® provides developers with impact assessment of new features and intelligent work plans." Jul. 25, 2002. http://www.axiomaticdesign.com/about/press07252002.asp*

Nam P. Suh, "Designing-in of Quality Through Axiomatic Design". IEEE Transactions on Reliability, Jun. 1995, vol. 44, Issue 2, pp. 256-264.*

Ishikawa, H. et al. "An Object-Oriented Database: System and Applications." IEEE Pacific Rim Conf. on Communications, Computers and Signal Processing, May 9-10, 1991. vol. 1, pp. 288-291.*

Sun-Jae Kim et al. "Design of Software Systems Based on Axiomatic Design." Robotics & Computer-Integrated Manufacturing, vol. 8, No. 4, pp. 243-55. 1991.*

(Continued)

*Primary Examiner*—Paul Rodriguez
*Assistant Examiner*—Ayal Sharon
(74) *Attorney, Agent, or Firm*—Daly, Crowley, Mofford & Durkee, LLP

(57) ABSTRACT

A method and system, which relates one or more geometric features to one or more functional requirements (FRs) in a design by using the V-model is described. The method and system include functional geometric features (FGFs), which relate the FRs to mechanical shapes (or geometric entities), which can be integrated to provide a final part or assembly that satisfies the functional requirements of the design.

21 Claims, 15 Drawing Sheets

OTHER PUBLICATIONS

Nam P. Suh. "Axiomatic Design Theory for Systems." Research in Design Engineering, vol. 10, pp. 189-209. 1998.*

Stephan Rudolph, "On a Mathematical Foundation of Axiomatic Design" Proc. 1996 ASME Design Eng'g Technical Conf. Aug. 18-22, 1996.*

Joe Klaesner & Dan Kuster, "Axiomatic Design: BME 401". Sep. 28, 2005. http://medicine.wustl.edu/~klaesnej/BME/present/axiomatic2005.ppt.*

Nam Pyo Suh, Axiomatic Design Advances and Applications, 2001, pp. 1-503, Oxford University Press, Oxford, New York.

* cited by examiner

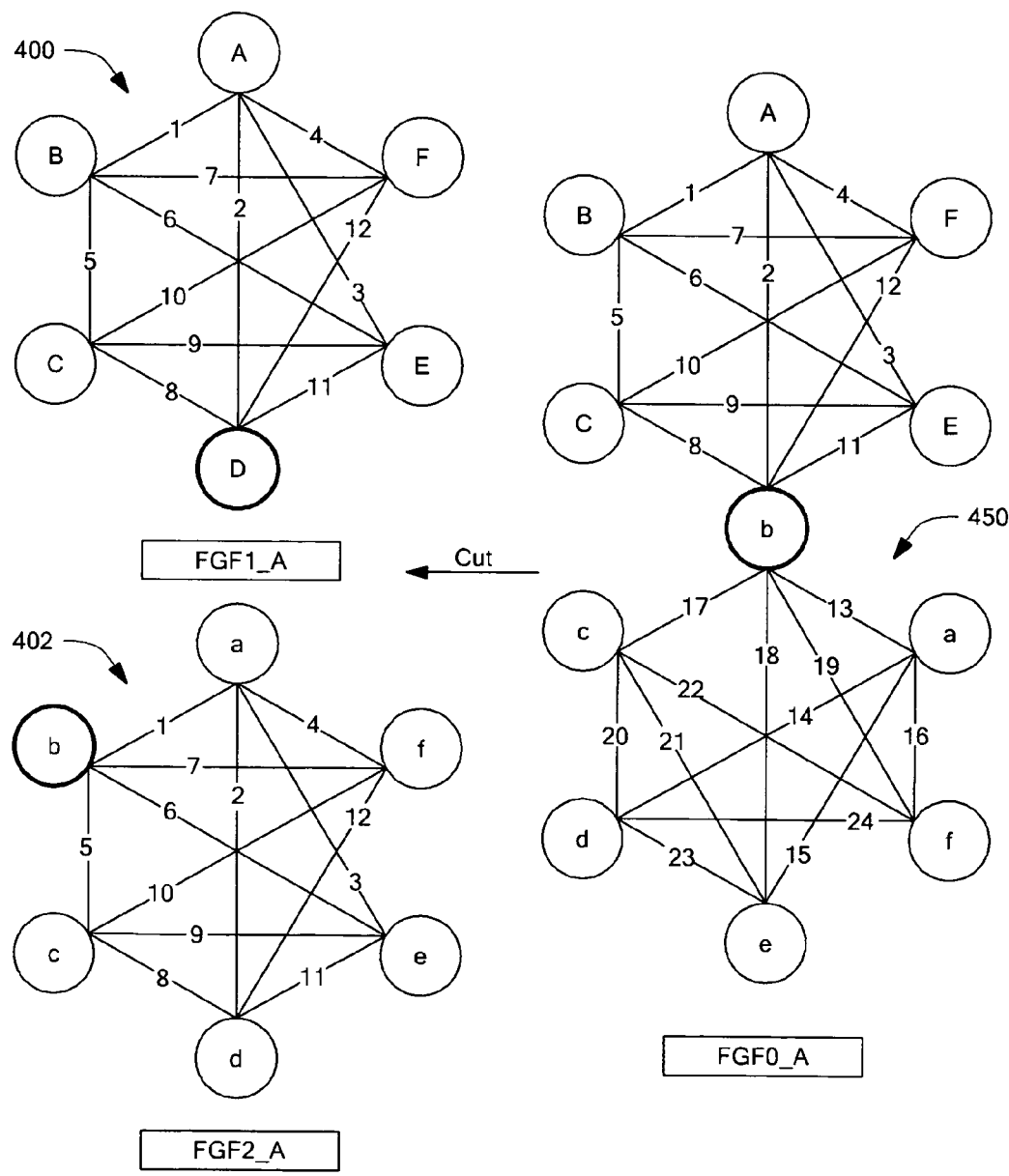
*FIG. 4*     *FIG. 4A*

| FRs | DPs | FGFs | Dangling Interfaces | |
|---|---|---|---|---|
| FR0 = hang a load on the wall with a certain stiffness | DP0 = hanger | C1 | {FGF_1, FGF_2} C1(against:rigid_attachment) | a |
| FR1 = hang a load | DP1 = L-beam | C1, A1, B1 | {Cell_1} A1(against:rigid_attachment) B1(against:rigid_attachment) C1(against:rigid_attachment) | b |
| FR2 = increase stiffness | DP2 = triangular rib | A2, B2 | {Cell_2} A2(against:rigid_attachment) B2(against:rigid_attachment) | c |

*FIG. 5*

| Dangling Interface | Internal Interface Match | FGF |
|---|---|---|
| C1 | {FGF_1, FGF_2} (A1:A2), (B1:B2) | FGF_0 |
| A1, B1, C1 | {Cell_1} | FGF_1 |
| A2, B2 | {Cell_2} | FGF_2 |

| Cell | Interface | Geometry |
|---|---|---|
| Cell_1 | A1, B1, C1 | |
| Cell_2 | A2, B2 | |

*FIG. 5A*

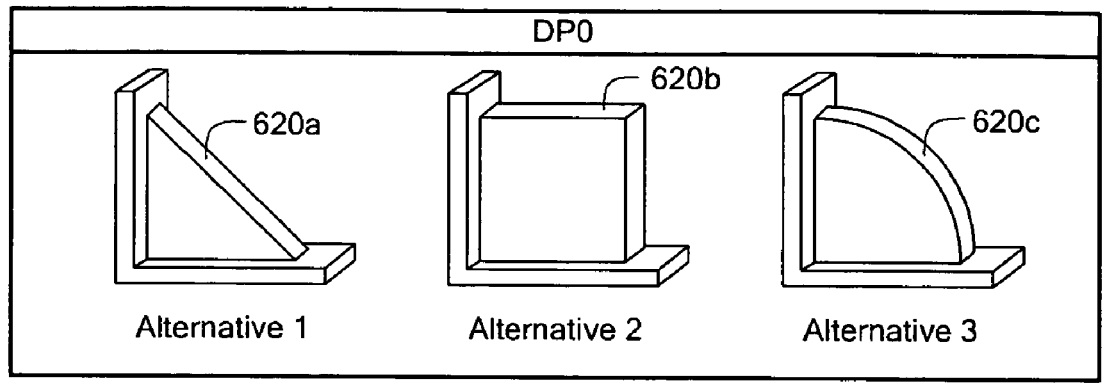
FIG. 6B
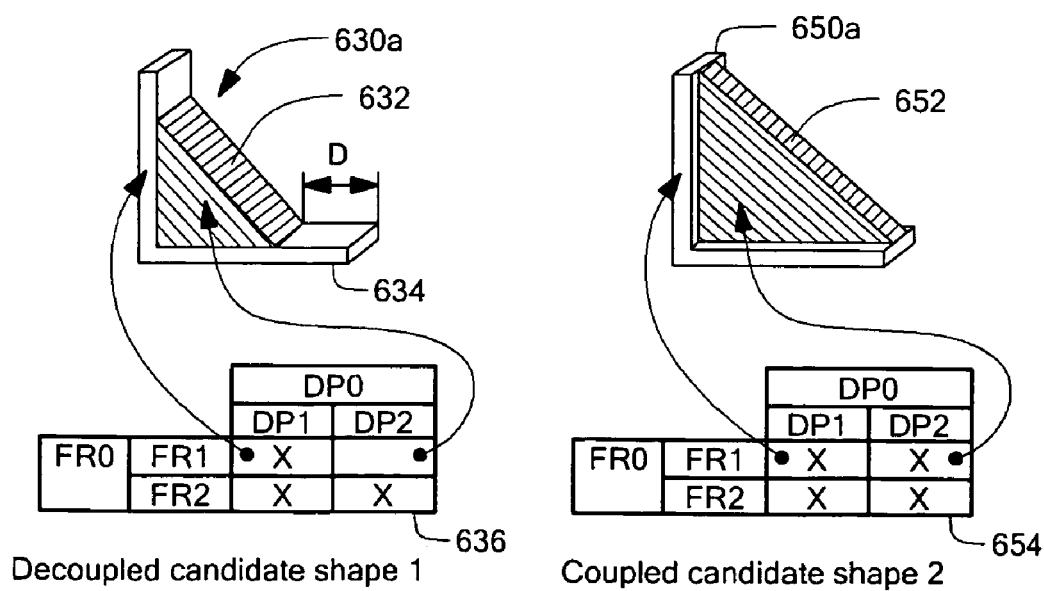
FIG. 6C  FIG. 6D

METHOD AND SYSTEM FOR COMPUTER AIDED DESIGN

CROSS REFERENCE TO RELATED APPLICATIONS

This application claims the benefit under 35 U.S.C. §119(e) of application No. 60/385,690, filed Jun. 4, 2002, which application is hereby incorporated herein by reference in its entirety.

STATEMENT REGARDING FEDERALLY SPONSORED RESEARCH

Not Applicable.

FIELD OF THE INVENTION

This invention relates generally to computed aided design (CAD) and more particularly to a system and technique for generating a design solution in response to a set of functional requirements.

BACKGROUND OF THE INVENTION

As is known in the art, the design of a mechanical product or device is generally an iterative, multi-level decision-making engineering process, where the highest level functional requirements (FRs) are decomposed in a systematic manner. The design process typically begins with an identification of customer needs and proceeds through a sequence of activities to seek a solution to the defined task through specification, synthesis, analysis, and evaluation. The process ends with the detailed description and/or geometric models of the product.

The design process can be divided into three stages. A first stage corresponds to a mapping from customer needs to FRs, where information about a product is collected and transformed into engineering specifications and goals. A second stage corresponds to a conceptual design phase, in which the primary concern is the generation of geometric designs to meet the FRs through the creation of design alternatives and selection of a best design from the set. Designers at this stage must create rough sketches or solid models and pass them along to other designers with descriptions of the concepts in order to detail the concepts. A third stage corresponds to a detailed design phase. During this final phase, final decisions about dimensions are made. Also, more detailed geometric shapes of individual components are generated. Furthermore, material selections are made. Among the three stages described above, the conceptual design phase plays an important role in the overall success of design. Good design decisions made during the conceptual design phase can reduce iterations between design stages and processes, and eventually lead to a satisfactory final product.

Current computer aided design (CAD) technology successfully supports generation of geometric shapes and assemblies of physical objects in the detailed design stage using solid modeling techniques and specific data structures. However, current CAD programs are understood as drawing packages, which cannot be used to support the conceptual design stage described above. Solid modeling techniques are useful only after detailed shapes of the physical objects have been determined.

There exist many CAD approaches to using a database in the design process. Many of these approaches classify CAD models by similarity of shapes. Thus, the design process involves receiving an input geometric model, and searching the database for a shape similar to the geometric model. In these approaches, it is relatively easy to collect and classify CAD models and to find similar shapes from a CAD database, but still the CAD database cannot help designers generate design solutions. The conventional CAD database is usually used merely to find similar parts for manufacturing purpose and to classify shapes.

The organization of design information is an important factor in determining performance and functionality of a CAD system. Existing CAD systems are primarily concerned with data structure and information flow for representing and constructing 3D shapes. The existing CAD systems enable generation of complex shapes. They also utilize the geometric information in designing and manufacturing products. Feature-based representation or design is a result of such an effort. One of the key benefits of using features is that the designer can put their design intent into the geometric model. Also, many techniques using features have been developed to automate machining, to diagnose the defect of geometric models, to generate finite element models, and so on.

SUMMARY OF THE INVENTION

Nevertheless, it has been recognized in accordance with the present invention that, there still exist two main shortcomings for the feature-based design systems to be useful for designing physical objects. A first shortcoming is the lack of a means for defining features based on function, though a major benefit of using features is to put design intent into geometry. A second shortcoming is a difficulty collecting geometric features to be reused.

The shortcomings of exiting computer aided design (CAD) systems exist because most research on features or geometric models is conducted only in the physical domain. For example, some CAD systems classify static features into five types: primitives, intersections, add-ons, macros, and whole-forms, and then constructed a feature library to reuse them. Other CAD systems address the problem of integrating design by features, interactive definition, and automatic recognition by providing designers with templates to edit features by formal language. The taxonomy used in such CAD systems is useful to handle geometric features in a physical domain, but no information about function of the features is included in the conventional CAD design system. Capability of the feature based design system is limited by the number of the collected features or templates, but it is not easy to collect the pre-defined features for design intent only in terms of geometric features in the physical domain.

Since commercially available CAD systems cannot reason and create geometric shapes based on the functional requirements (FRs), human designers must make all the basic design decisions about geometric details. It has thus also been recognized in accordance with the present invention that the lack of functional representation within a CAD model limits the usefulness of CAD in developing a new product, because designers do not understand why certain shapes are created, and must update the CAD models based only on the geometric parts and their assemblies.

Furthermore, it is difficult to reuse existing design knowledge using existing CAD models in order to develop new geometric objects. In most CAD systems, the geometric objects are decomposed only in the physical domain, relating only information and knowledge of geometry of the artifacts. However, the artifacts are actually designed to satisfy FRs and therefore, they must be functionally decomposed from the early stage of the design.

The present invention thus relates to a computer aided design (CAD) method and system having the ability to receive a set of functional requirements (FRs) and associated mechanical shapes and the ability to integrate the simple mechanical shapes in a way which satisfies the FRs while providing a final part or assembly. The FRs can be provided by decomposing a design (e.g., a mechanical object), which includes considering customer needs and top-level functional requirements.

In accordance with a further aspect of the present invention, a method for assembling a mechanical part includes generating a hierarchy of functional requirements (FRs), generating a hierarchy of functional geometric features (FGFs), identifying one or more interfaces for each of the FGFs, integrating the FGFs into one or more topologies which satisfy at least some of the FRs in the hierarchy of FRs and determining a final shape from among the one or more topologies.

With this particular arrangement, a CAD method, which relates geometric features to functional descriptions by using a V-model, is provided. This is in contrast to prior art method and systems in which geometric features are typically highly related to solid modeling techniques (extrusion, cut, hole, round, and so on) or manufacturing features (slots, pockets, steps, and so on). The technique of the present invention provides a designer with the ability to construct a final mechanical part or assembly from simple FGFs while ensuring that FRs are satisfied. It is understood that there may exist some cases in which geometric entities cannot be separated from a whole solid. In those cases, it is proposed that the corresponding geometric features do not have to be separated. A cell that represents more than one FGF can be defined to satisfy the corresponding FRs. The importance of the V-model resides in that it can be used to link each geometric feature to corresponding FRs in a logical and systematic way. In some other cases, one FGF may be redundantly used to integrate in a level of a hierarchical tree.

In accordance with a still further aspect of the present invention, a computer readable medium includes instructions for generating a functional geometric feature (FGF) hierarchy tree, instructions for identifying interfaces associated with the FGFs, instructions for constructing topologies associated with the FGFs, and instructions for determining a final shape.

With this particular arrangement, the computer readable medium provides a designer with the ability to construct a final mechanical part or assembly from simple FGFs with a computer.

In accordance with yet another aspect of the present invention, a method of computer aided design (CAD) includes providing a functional requirement (FR) and searching a knowledge database for a language match to an FR stored within the knowledge database. The FR stored within the knowledge database is associated with a functional geometric feature (FGF), which is also stored within the knowledge database. The FR within the knowledge database can be used to construct an FR hierarchy tree resulting in an FGF hierarchy tree.

With this particular arrangement, the method provides a designer with the ability to automatically decompose a top-level functional requirement (FR) into lower level FRs contained in the knowledge database.

In accordance with another aspect of the present invention, a system for computer aided design includes a processor coupled to a knowledge database having functional requirements (FRs), design parameters (DPs), and functional geometric features (FGFs) stored therein.

With this particular arrangement, a system having the ability to automatically integrate FGFs into a mechanical object by considering customer needs and top-level functional requirements is provided.

BRIEF DESCRIPTION OF THE DRAWINGS

The foregoing features of the invention, as well as the invention itself may be more fully understood from the following detailed description of the drawings, in which:

FIG. 4 is a face-edge graph corresponding to the exploded view of the object shown FIG. 3;

FIG. 4A is a face-edge graph corresponding to an assembled view of the object shown in FIG. 3;

FIG. 5 is a table, which illustrates an exemplary physical object decomposed into cells;

FIG. 5A is a table illustrating a relationship between functional geometric features and cells for the exemplary physical object of FIG. 5;

FIG. 6B is a pictorial showing alternative arrangements, also called topologies, of the physical object of FIG. 6;

FIG. 6C is a pictorial showing a design matrix associated with an arrangement of the physical object of FIG. 6;

FIG. 6D is a pictorial showing a design matrix associated with an alternate arrangement of the physical object of FIG. 6;

DETAILED DESCRIPTION OF THE INVENTION

In general overview, the method and system for computer aided design (CAD) described herein includes a V-model design process, database, and computer implemented processes for searching candidate functional geometric features (FGFs) and automatically assembling them. Techniques and systems generated from the concepts described herein have been used to generate interesting and reasonable shapes, which are satisfying input FRs, as shown in several specific application examples described herein below. It should be appreciated, however, that the techniques and systems described herein are generally applicable to all kinds of shape design problems, and are not an ad-hoc approach for specific design problems described herein.

Before describing the CAD method and system of the present invention, some introductory concepts and terminology are explained. As used herein, the term "geometric entities" is used to refer to vertices, edges, faces, solids, or assemblies. Any geometric entities can be mapped to a certain functional requirement (FR). Based upon the geometric entities, a knowledge engineer can make cells by cutting the whole solids and relating the cells as a functional geometric feature (FGF). Consequently, an FGF includes the corresponding geometric entities as parts of cells.

Also, reference is sometimes made herein to decomposing an object into the smallest (or simplest) cell. It should be appreciated that such reference should be taken literally, rather such reference should be interpreted as meaning the smallest (or simplest) desirable cell and that it might be possible to decompose the object into some lower level which in some cases might still include relatively complex shapes and then integrate these relatively complex shapes up the hierarchy. That is, the level to which an object is decomposed depends upon how the decomposition is accomplished. It is not necessarily a decomposition of a solid object into truly small cells, which cannot be decomposed further. Rather an object can be decomposed into cells, which can be any shapes. However, the lowest-level cells, which are composed of FGFs, should be correctly mapped to the corresponding lowest-level FRs. Thus, the decomposition of cells depends upon the decomposition of FRs and DPs.

Figure 1:
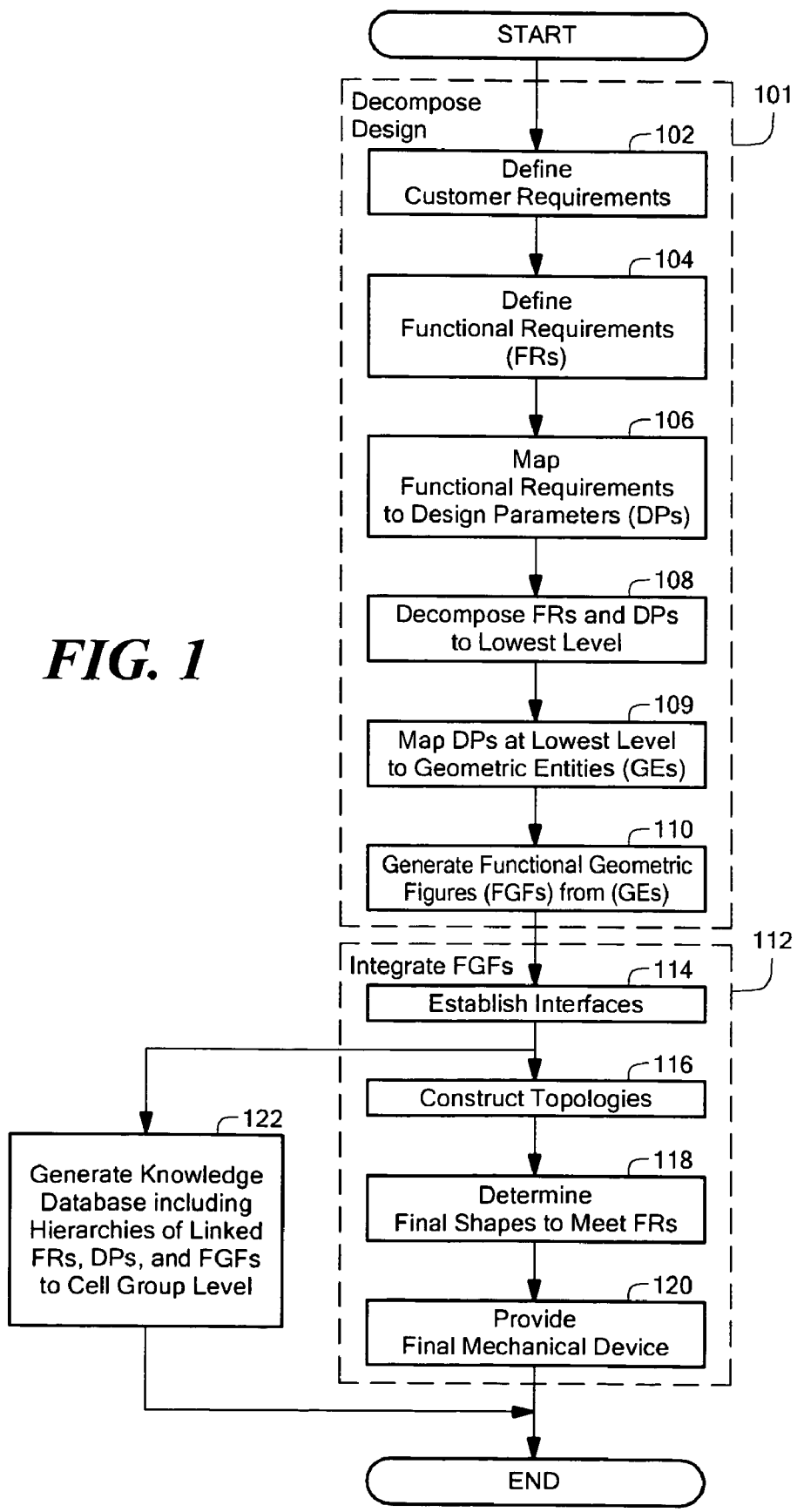
FIG. 1 is a flow diagram, which illustrates a process for applying a V-shaped model to a mechanical design process.

Referring now to FIG. 1, a flow diagram 100 illustrating a process in accordance with the present invention begins at a first group of steps 101 which perform a "decomposition" of a design. At step 102 of the decomposition, customer requirements (CRs) are identified. Customer requirements can be in the form of verbal instructions or a text description having sentences and paragraphs of information.

At step 104, top-level functional requirements (FRs) are generated in accordance with the CRs identified at step 102. At least some of the top-level FRs correspond to a problem that a designer is attempting to solve. Each FR can be generated as a text word, phrase, or sentence. For a particular design task, there may be only one top-level FR, or there can be several top-level FRs.

A particular example of an FR is "hang a load of 100 pounds on a wall with a stiffness." As described above, this exemplary FR corresponds to a problem, hanging something on a wall, that the designer is attempting to solve.

At step 106, a top-level design parameter (DP) is generated for each top-level FR. Each DP corresponds to a design solution for an associated FR. Each DP is generated as a text word, phrase, or sentence. Continuing with the example above, a top-level DP can be "hanger." Therefore, the exemplary FR design problem described above is solved with the hanger.

At step 108, the top-level FRs and DPs are decomposed to provide lower level FRs and lower level DPs. The FRs are first decomposed to a next level and corresponding DPs are generated. The corresponding DPs are used to generate a still further level of FRs, and so on. The FRs are progressively decomposed to lower levels of requirements and corresponding DPs are generated to the lower levels until a lowest level is reached. The lowest level is referred to herein as a "leaf level." Essentially, the decomposing step 108 results is a zigzag between FRs and DPs, generating a hierarchy tree of FRs and a hierarchy tree of DPs as the decomposing step 108 continues. A hierarchy tree is shown in pictorial form in FIG. 2.

At step 109, each of the DPs generated at step 108 is mapped to a geometric entity (GE). The term geometric entity, as used herein, refers to a specification of a portion of a physical object, for example a specification of an edge, a vertex, and/or a face. Therefore, each DP results in identification of a geometric entity to fulfill the associated design parameter.

At step 110, the GEs at the lowest level are used to provide functional geometric features (FGFs). FGFs correspond to physical objects, which can be parts of an assembly. Essentially, the FGFs, mapped to the leaf level DPs, are physical objects that satisfy the corresponding leaf level FRs, DPs, and GEs. An FGF is a physical object, and can be associated with a text description (also referred to herein as a text model) having a predetermined text structure. An exemplary text model associated with an FGF is described below in association with FIG. 4A. An FGF can include a set of "cells" or alternatively, can be a single cell. An exemplary cell is described in conjunction with FIG. 4. Suffice it here to say that a cell is a simple geometric shape, for example, a cube or a box or a pyramid. A cell can also be either two-dimensional or three-dimensional geometric shape. A cell can include one or more geometric entities, e.g., faces, edges, etc.

A group of steps 112 is used to integrate the FGFs, which were identified by the group of steps 101. At step 114, interfaces are established for each FGF. The interfaces correspond to features on an object to which another object can couple. An interface can, for example, correspond to one or more faces of a physical object to which another object can couple. Interface types include, but are not limited to, a rigid interface, an against interface, a fits interface, a roll interface, a slide interface, a tight-fits interface, a coplanar interface, a face-edge interface, an edge-edge interface, and a face-vertex interface. Interface types are further described below.

An interface associated with an FGF is provided as a text description having a predetermined structure. The interface can be provided as part of the FGF text model described above. In another embodiment, the interface can be provided separate from the FGF text model. An exemplary text structure associated with an interface is described below in association with FIG. 4A.

At step 116, topologies are constructed. The topologies represent integrated combinations of selected FGFs from among many FGFs. Each topology is selected as a coupling associated with a group of FGFs. The topologies also identify faces of the selected FGFs, which are to be coupled. Therefore, each topology corresponds to a particular coupling between a particular selected set of FGFs.

At step 118, final shapes are determined. The final shapes are also referred to herein as final parts. For any particular topology having a set of coupled FGFs, determination of a final shape involves a process of positioning, orienting, and stretching/rotating coupled FGFs relative to each other.

At step 120 the final shapes are integrated to provide a final mechanical device or assembly.

Optionally, at step 122, the decomposed FRs and the decomposed DPs generated at step 108 and the FGFs generated at step 110 having the interfaces identified at step 112 can be entered into a knowledge database. As described above, each of the decomposed FRs and the decomposed DPs generated at step 108 and the FGFs generated at step 110 having the interfaces identified at step 112 are provided as a text description. The text descriptions are saved to the knowledge database at step 122.

It will become apparent from discussion below, that the knowledge database, once generated at step 122, can be used to provide FR hierarchy trees, DP hierarchy trees, and FGF hierarchy trees automatically, replacing some or all of the steps 106-114. Having the hierarchy trees, the designer can enter the flow chart 100 at step 114 or step 116.

The mapping of the FRs to DPs at step 110 can be described by and analyzed by a "design matrix." A design matrix can be described by the following relationship:

$$\begin{Bmatrix} FR1 \\ FR2 \\ FR3 \end{Bmatrix} = \begin{bmatrix} A11 & A12 & A13 \\ A21 & A22 & A23 \\ A31 & A32 & A33 \end{bmatrix} \begin{Bmatrix} DP1 \\ DP2 \\ DP3 \end{Bmatrix} \quad \text{where,} \quad Aij = \frac{\partial FRi}{\partial DPj}.$$

In the above expression, Aij represents sensitivity, either qualitative or quantitative, of FRi with respect to DPj and it can be interpreted as a causality, which represents cause-effect between DPs and FRs. The elements Aij of the design matrix (DM) are determined in a mapping process. Matrices below show different coupling conditions represented by the design matrix.

$$\begin{bmatrix} X & O & O \\ O & X & O \\ O & O & X \end{bmatrix} \begin{bmatrix} X & O & O \\ X & X & O \\ X & X & X \end{bmatrix} \begin{bmatrix} X & X & X \\ X & X & X \\ X & X & X \end{bmatrix}.$$
Uncoupled  Decoupled  Coupled A design must be decomposed deeply enough to obtain the mathematical relationship between FRs and DPs and to select parameters or dimensions as key variables to calculate an "information content," $I_i$, as a quantitative value associated with a given $FR_i$ which is defined as:

$$I_i = \log_2 \frac{1}{p_i} = -\log_2 p_i,$$

where pi is probability of success. A "total information content," $I_{sys}$, can be formulated as described below based on the definition of information content, $I_i$, for an FR. For the uncoupled design, $$I_{sys} = \log_2 p_{\{m\}} - \sum_{i=1}^m \log_2 p_i, \text{ where } p_{\{m\}} = \prod_{i=1}^m p_i$$

and for the decoupled design, $$I_{sys} = -\log_2 p_{\{m\}} = \sum_{i=1}^m \log_2 p_{i|\{j\}}, \text{ where}$$

$$p_{\{m\}} = \prod_{i=1}^m p_{i|\{j\}} \text{ for } \{j\} = \{1, 2, \ldots, i-1\}$$

Here, $p_{\{m\}}$ is a joint probability that all m FRs are satisfied, and $pi_{i|\{j\}}$ is the conditional probability of satisfying FRi given that all other relevant (correlated) $\{FR_j\}_{j=1,2\ldots i-1}$ are also satisfied.

As used herein, a design range is a design range goal that a designer attempts to achieve, and a system range is a statistical function that describes the actual range achieved. The probability of success can be defined as a common range in which the system range(SR) overlaps inside of the design range (DR). The larger the common range, the higher the probability of success.

Figure 1A:
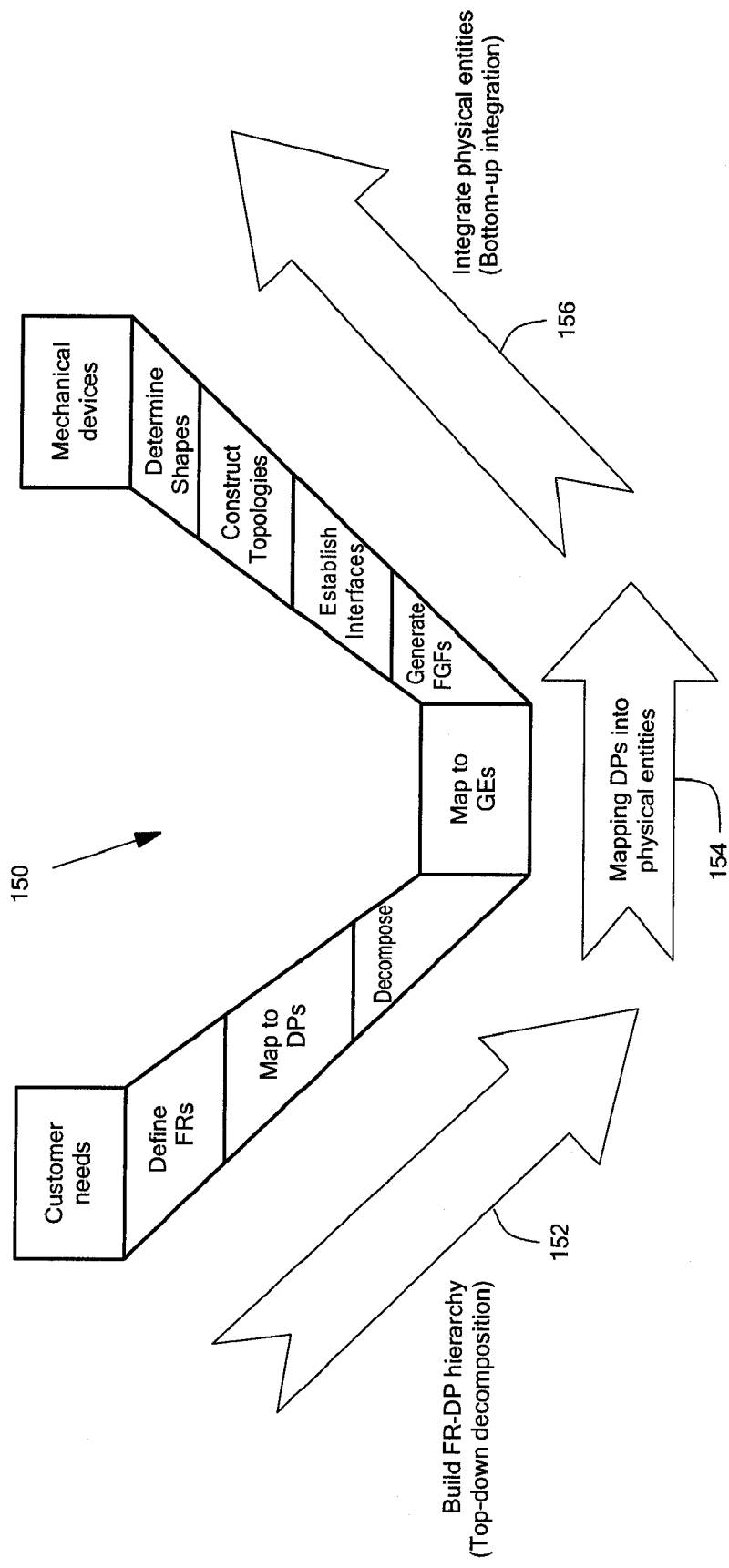
FIG. 1A is an alternate view of the V-shaped model as applied to a mechanical design process.

Referring now to FIG. 1A, the process 100 of FIG. 1 can alternatively be represented as a V-shaped model 150. Steps 101 of FIG. 1 correspond to a top-down decomposition 152 and steps 112 of FIG. 1 correspond to a bottom-up integration of physical entities 154.

Figure 2:
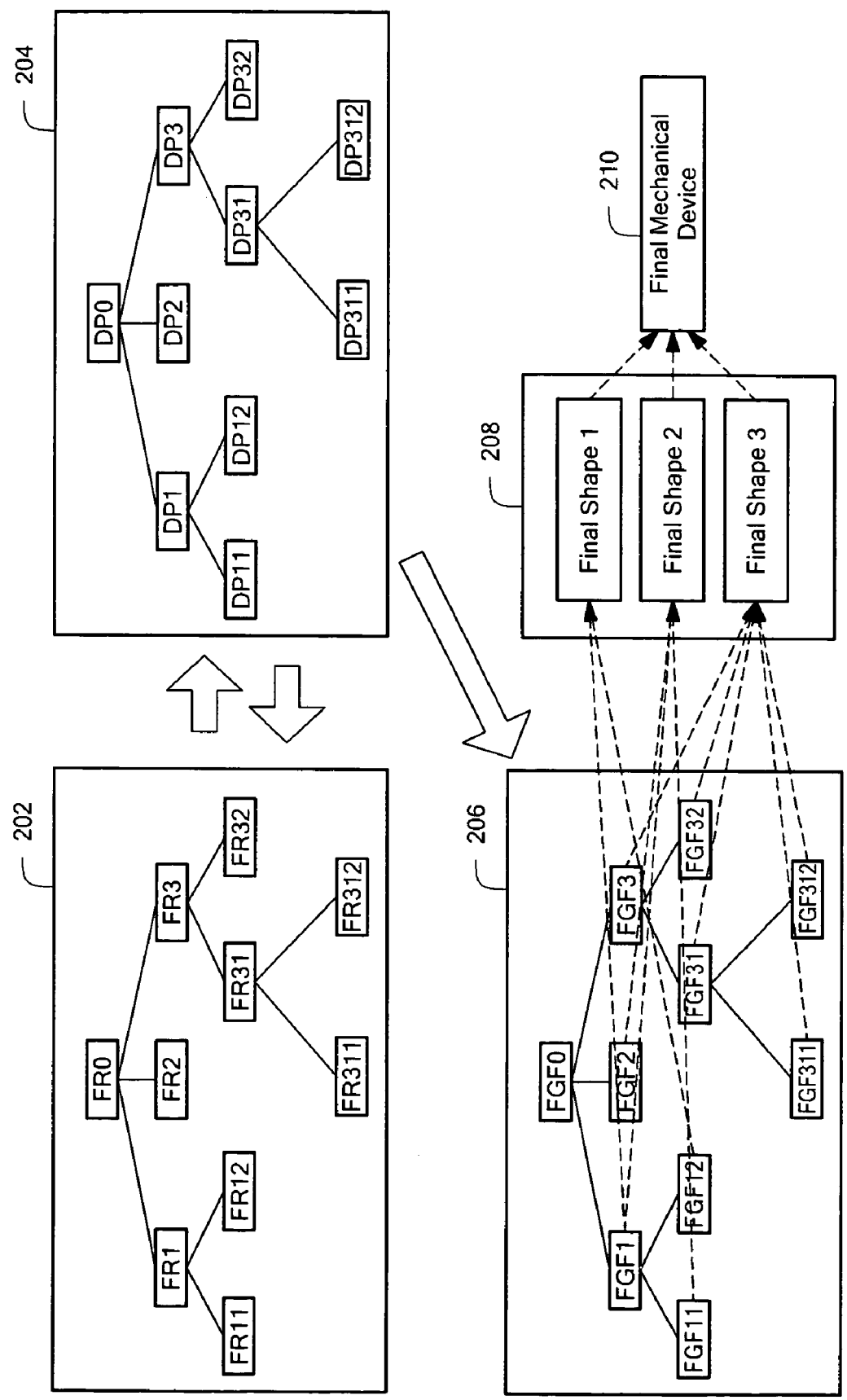
FIG. 2 is a schematic diagram which illustrates hierarchies of functional requirements (FRs), design parameters (DPs), and functional geometric features (FGFs), and which illustrates the relationships between the hierarchies to identify physical parts.

Referring now to FIG. 2, a hierarchy tree of FRs 202 includes FR0 at a top-level, FR1, FR2, and FR3 at a second level, FR11, FR1 2, FR31, and FR32 at a third level, and FR311 and FR312 at a fourth level. A corresponding hierarchy tree of DPs 204 includes DP0 at a top-level, DP1, DP2, and DP3 at a second level, DP11, DP12, DP31, and DP32 at a third level, and DP311 and DP312 at a fourth level. As described above, in conjunction with step 108 of FIG. 1, the hierarchy trees 202, 204 are decomposed from a top of the tree, beginning with only the top-level, FR0, and constructing the hierarchy trees 202, 204 by alternating back and forth between the FRs and the DPs. The fourth level, having FR311, FR312, DP311, and DP312 can be the lowest level, also referred to as the leaf level.

A hierarchy tree 206 of FGFs includes FGF0 at a top-level, FGF1, FGF2, and FGF3 at a second level, FGF11, FGF12, FGF31, and FGF32 at a third level, and FGF311 and FGF312 at a fourth level. The hierarchy tree 206 is generated at step 110 of FIG. 1, by mapping the DPs to associated FGFs.

Sets of FGFs are selected, for example at step 116 of FIG. 1. Each set of FRs is associated with a topology described in association with step 116. Each topology is processed at step 118 of FIG. 1 to provide an associated final shape, also referred to herein as a physical part.

For example, as shown, a set of FGFs including FGF1, and FGF12 is selected to provide a final shape 1, a set of FGFS including FGF1, FGF2, and FGF11 is selected to provide a final shape 2, and a set of FGFs including FGF3, FGF32, FGF31 FGF311, and FGF312 is selected to provide a final shape 3. The final shapes 208 are integrated to provide the final mechanical device 210.

Figure 3:
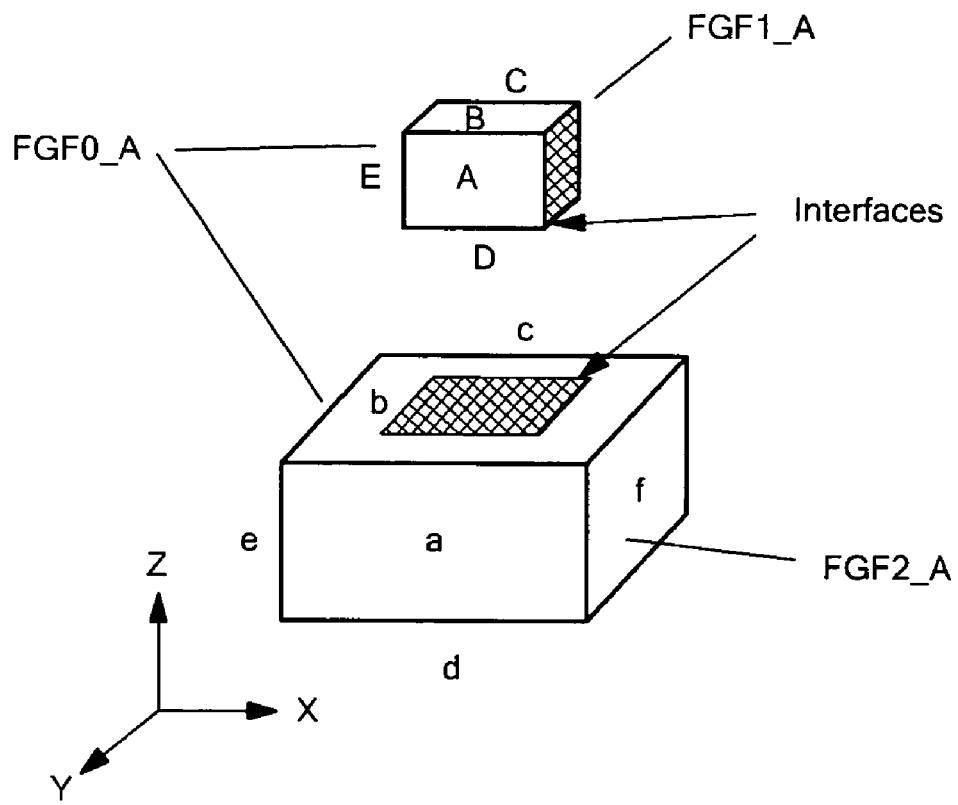
FIG. 3 is an exploded isometric view of an exemplary object, which is represented as a set of cells.

Referring now to FIG. 3, a physical part FGF0_A includes two lower level FGFs, here identified as FGF_A and FGF2_A. When FGF1_A and FGF2_A are joined together, they form FGF0_A. Here the physical part FGF0_A is shown as an exploded view. Essentially, the physical part FGF0_A has been "cut" into two simpler physical parts, FGF1_A and FGF2_A.

Each of the simpler physical parts FGF1_A and FGF2_A corresponds to a "cell." A cell can be a relatively simple physical shape, including, but not limited to a polyhedral object, a cube, a cone, a cylinder, a sphere, and a torus. However, a cell, as used herein, can be any reasonably simple shape that can be described by one of two methods discussed below, including a face-edge graph as shown in FIG. 4 and a text model description as described in association with FIG. 4A.

Any physical part can be decomposed to a set of cells, or in some cases to a single cell. It should, however, be understood that a physical part can be decomposed into a set of cells in different ways. Each resulting set of cells can be a different set of cells.

Cell FGF1_A has six faces having reference designations A-D and cell FGF2_A has six faces having reference designations a-d. Coordinates X, Y, and Z provide a coordinate system relative to which the faces A-D and a-d can be described. Face D of cell FGF1_A is shown to couple to face b of FGF2_A.

Functional geometric features (FGFs) can be topologically and geometrically separated from a whole solid body or an assembly. While one type of shape decomposition is shown in FIG. 3, two kinds of the shape decomposition operations can been considered. FIG. 3 essentially indicates a "cut" operation, wherein an object is cut into cells. However, a cell can also be associated with a negative geometry, for example a cavity in another object. Therefore, a "subtraction" operation can subtract a cell from an object. Each FGF is a set of cells. The cell is decomposed into either positive volume as shown in FIG. 3 or negative volume as described above. It should be recognized that the cells associated with a lower level FGF are a subset of elements of its parent FGF.

Figure 3A:
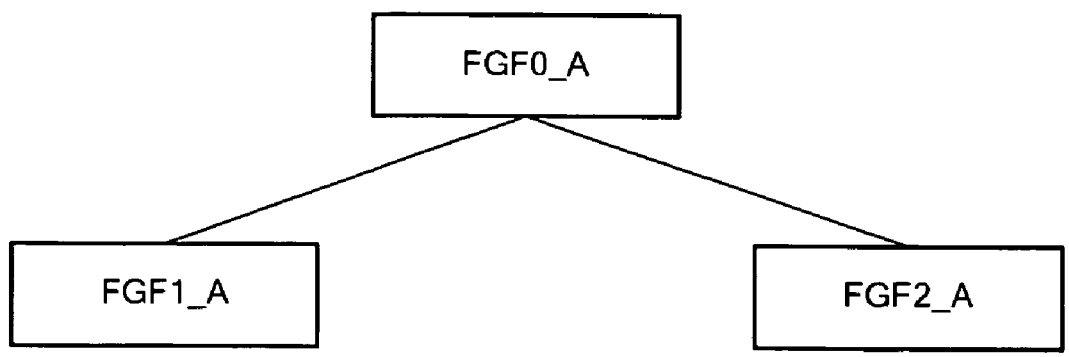
FIG. 3A is a functional geometric feature hierarchy of the object shown in FIG. 3.

Referring now to FIG. 3A, an exemplary FGF hierarchy tree 300 associated with the shape FGF0_A of FIG. 3, includes two levels. The second level FGF1_A and FGF2_A are combined to provide FGF0_A. FGF1_A and FGF2_A are at a lowest level of the hierarchy tree 300, and each corresponds to a cell.

Each cell, for example the cell FGF1_A, can be described in a variety of ways. In one embodiment, the cell FGF1_A is described as a set of faces having coupling relationships between the faces. Such a description can be in the form of a face-edge graph. Face-edge graphs are shown in FIGS. 4 and 4A. Such a description can also be in the form of a text model. Text models are described in conjunction with FIG. 4A.

Referring now to FIG. 4, a face-edge graph 400 includes information about the faces and edges of cell FGF1_A and a face-edge graph 402 includes information about the faces and edges of cell FGF2_A of FIG. 3. In particular, the faces A-D associated with the cell FGF1_A are shown as circles or nodes, and faces a-d associated with the cell FGF2_A, are also shown as circles or nodes. Lines connecting the faces (nodes), labeled 1-12 for cell FGF1_A and 1-12 for cell FGF2_A, correspond to edges connecting the faces to which the lines are coupled. For example, face D of cell FGF1_A is coupled to face E, the coupling represented by a line 11, to face C, the coupling represented by a line 8, and to face A, the coupling represented by a line 2.

Node D of cell FGF1_A and node d of cell FGF2_A are identified by darker circles indicating those faces which are coupled to provide a physical shape FGF0. It should be understood that any of the faces A-D and a-d can be designated by a designer to be faces to which an interface can be established. Such designation, for example, can be made at step 112 of FIG. 1. Here, only two faces D, b have been designated to be those faces capable of supporting an interface. Since nodes (faces) D and b are not coupled in the face-edge graph 400, the face-edge graph 400 corresponds to the exploded view of FGF1_A and FGF2_A as shown in FIG. 3

Referring now to FIG. 4A, a face-edge graph 450 includes all of the features of the face-edge graphs 400, 402 of FIG. 4. Here, however, nodes (faces) D of FGF1_A and d of FGF2_A are joined as indicated by the dark circle d. Therefore, the face-edge graph 450 corresponds to physical shape FGF0_A shown in FIG. 3A, indicating faces, edges, and couplings.

Face-edge graphs will be understood to be but one way to describe physical objects having faces and associated edges. Any representation(e.g. B-rep), which describes physical objects can be used to represent a geometry of each FGF, if its interfaces can be defined completely by the representation. A physical object can also be described in a text model, wherein the text model provides a description of faces, edges, and couplings. For example, the face D of FGF1_A can be described as a list of "attributes" as follows:

| | |
|---|---|
| Node_name | D |
| Cell_name | cell_1 |
| Face_type | planar |
| Dir_normal | (0, 0, −1) |
| interface_type | against: rigid_attachment |

In the above text model, the attribute Node_name is D, corresponding to the node D shown in the face-edge graph 400 of FIG. 4. The attribute Cell_name is here shown to be cell_1, corresponding to the cell name FGF1_A of FIG. 4. The attribute Face_type can be planar, corresponding to a planar of face. Here, and as shown in FIG. 3, the face D is a plane. The attribute Dir_normal describes a direction of a line normal to the face D relative to a coordinate system, for example the coordinate system of FIG. 3. Here, the line normal to the surface D is directed along the Z-axis (FIG. 3) in the negative direction (downward). The attribute Interface_type can be against: rigid attachment. The attribute Interface_type describes both that the face D is selected to be able to interfaced to another cell, and also that, when interfaced, the interface is rigidly attached. In the attribute Interface_type, "against" means that this planar face mates with another planar face.

It will be understood that the remaining five faces of FGF1_A of FIG. 3 can be similarly described in text and that the set of six such text descriptions form a text model of FGF1_A that has the same information as the face-edge graph 400 for FGF1_A of FIG. 4. The face-edge graph 402 for FGF2_A of FIG. 3 can also be similarly described as a text model.

While the above text models describe cells having a box shape with planar faces, cells having faces with other shapes can also be described in text models. For example, attributes associated with an arc-shaped edge can be related to information about the arc-shaped edge and about faces connected to the arc-shaped edge. An exemplary arc-shaped edge between two faces (nodes) D and E can have the following attributes:

| | |
|---|---|
| Edge_name | 11 |
| Cell_name | cell_1 |
| Node_1 | D |

| | |
|---|---|
| Node_2 | E |
| Edge_type | linear |
| Edge_geometry | (x1, y1, z1), (x2, y2, z2) |

The attribute Edge_type can indicate that, though an arc-shaped edge, the edge has a linear shape. The attribute Edge_geometry can have information about the geometry of the arc-shaped edge, for example two vertex point vectors (x1, y1, z1) and (x2, y2, z2).

As described above, the attribute Interface_type can be a rigid attachment. However, a face of a physical shape can be associated with other types of attachment. Other types of attachment include, but are not limited to, the following:

Rigid attachment: two cells are merged into a solid. A face should be rigidly attached with another face, or a volumetric cell can be subtracted from a bigger volumetric cell.

Assembly: two solid cells contact each other.
  Static: two cells contact without relative motion between each other.
  Kinematic: two cells contact with relative motion between each other. This interface can be classified further into "slide", "roll", and "rotate."

Types of attachment can be further broken down as follows:

Against:assembly: two planar faces are located on a plane with opposite normal vectors.

Against_equal:rigid_attachment: all the boundaries of two planar faces are exactly matched together.

Against_inside:rigid_attachment: a planar face is placed inside of another planar face.

Against_intersected:rigid_attachment: two planar faces are intersect on a plane.

Fits:assembly: centerlines of a cylinder and a hole are located on a line. This interface type is classified into 'cylinder,' or 'hole' for each mating face.

Tight-fits: assembly: centerlines of a cylinder and a hole are located on a line and the circumference of the hole meets the circumference of the cylinder such that the cylinder and the hole meet together. This interface type is classified into 'cylinder,' or 'hole' for each mating face.

Referring now to FIG. 5, a table 500 shows an example of how to generate FGFs for a hanger. Once generated, the FGFs are decomposed to cells by simple disassemblies and cut operations as described in association with FIG. 3. The table 500 has a first column 502 indicating decomposed FRs associated with a design problem. The table 500 also includes a second column 504 indicating decomposed DPs associated with the decomposed FRs of column 502. Also, the table 500 includes a third column 506 illustrating FGFs as geometric shapes associated with the respective decomposed DPs. Lastly, in a fourth column 508 the table 500 includes a description of cells and "dangling interfaces." An entry in the table 500 can be referred to by row an column. For example the first table entry is designated as an entry 502a, indicating column 502 and row a.

The term dangling interfaces is used herein to describe selected faces from among all of the faces associated with a physical object to which another object can be coupled in some way. Each dangling interface can be described as having a type of interface. For example, table entry 506c indicates an FGF having a triangular shape and table entry 508c indicates that faces A2 and B2 of the triangular shaped FGF are available for coupling. Furthermore, table entry 508c indicates that face A2 has an interface type described as (against:rigid_attachment) and the face B2 has an interface type described as (against:rigid_attachment).

In the table 500, a top-level FR0 at table entry 502a includes a text description "hang a load on the wall with a certain stiffness." FR0 corresponds to a top-level problem that a designer attempts to solve. DP0 at table entry 504a, associated with FR0, includes at description "hanger." DP0 indicates a top-level solution to the FR0 problem. FR1 and FR2 are table entries 502b and 504b respectively are functional requirements a level below FR0. DP1 and DP2 at table entries 504b and 504c respectively are DPs associated with FR1 and FR2 respectively. Each DP in column 504 is associated with an FGF in the column 506 and each FGF is provided with dangling interfaces in the column 508.

It should be recognized that the lowest level FGF1 and FGF2 are each composed of a respective cell indicated at table entries 508b and 508c. Each respective cell is associated with a text model description as described in association with FIG. 4. Here, in column 508, only the dangling interfaces are shown, each of which is a part of the text model description of a respective cell. Because FGF1 and FGF2 are assembled to provide FGF0 at table entry 506a, then FGF0 must be composed of a plurality of cells, each having a respective text model description. FGF0 can, therefore, be described by a text model, which is a combination of the text models for the plurality of cells.

All of the text models at each level of the FGF hierarchy tree can be stored in the knowledge database, for example at step 122 of FIG. 1.

Referring now to FIG. 5A, a table 520 includes three columns 522-526 and a table 530 includes three columns 532-536. The table 520 includes rows designated as a-c and the table 530 includes rows designated as a, b . A table entry is referred to herein by row and column. For example table entry 522a corresponds to the first row and first column of the table 520.

Table 520 shows in column 522 the dangling interfaces C1, A1, B1, C1, A2, B2 shown in table 500 of FIG. 5. In column 524 are shown interface matches. For example, the table entry 524a shows that FGF_1 is interfaced to FGF_2 and that face A1 (of Cell_1 of FIG. 5) is coupled to face A2 (of Cell_2 of FIG. 5), and that face B1 (of Cell_₁ of FIG. 5) is coupled to face B2 (of Cell_2 of FIG. 5). For example, A1 (against:rigid_attachment), a mating face of Cell 1, is interfaced with A2 (against:rigid_attachement), a mating face of Cell 2. Column 526 indicates an FGF name at each level.

The tables 520, 530 shows in column 526, 536 a mapping between FGFs and cells, here represented with arrows. Here, each FGF maps to one cell. For example FGF_1 maps to Cell_1. However, for other physical shapes, a lowest level FGF, for example FGF_₁, can map to a plurality of cells. Table 530 shows in column 534 the dangling interfaces associated with a respective cell. Column 536 indicates the physical shape as indicated in column 506 of FIG. 5.

Figure 6:
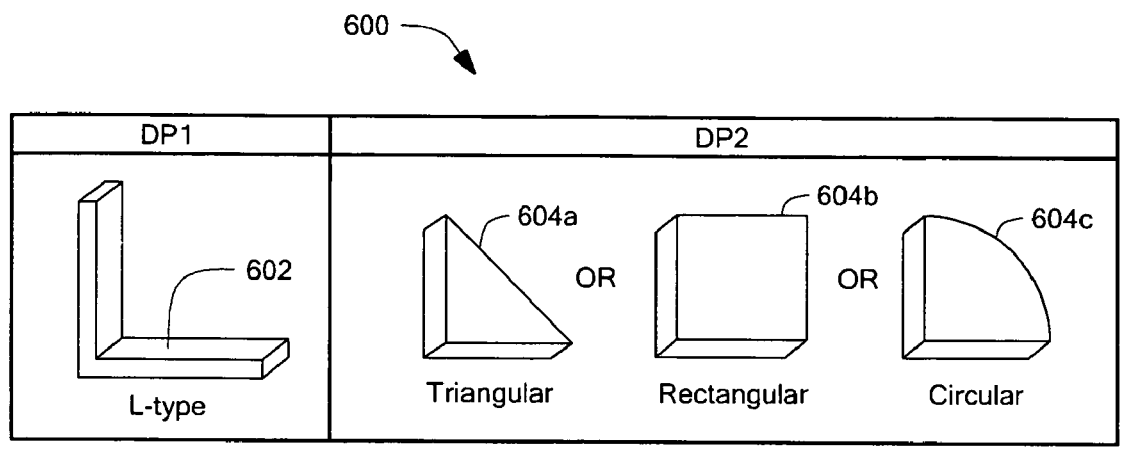
FIG. 6 is a pictorial showing alternative cells for an exemplary physical object.

Referring now to FIG. 6, a table 600 includes one physical shape 602 associated with a DP1 and three physical shapes 604a-604c associated with a DP2. In the example of FIG. 6, the decomposed FRs and DPs can, for example, be represented as follows:

FR0=hang a load on the wall with a certain stiffness
    FR1=hang a load

FR2=increase stiffness
    DP0=hanger
    DP1=L-type beam
    DP2=rib

The decomposed FRs and DPs as given above are determined, for example, at step 108 of FIG. 1 and the associated physical shapes or FGFs are determined at the step 110 of FIG. 1.

Whereas in the previous example of FIGS. 5 and 5A, the DP2 requirement shown in table entry 504c for DP2 is "triangular rib," in the example of FIG. 6, the DP2 requirement can be broader, for example "rib," as indicated above. The broader description of DP2 can lead to multiple candidate physical shapes associated with DP2 as indicated by the physical shapes 604a-604c.

The L-type beam 602 is mapped to DP I and three types of ribs 604a-604c are mapped to DP2 as candidate design solutions to satisfy FR1 and FR2. A design matrix can be constructed having only diagonal elements, indicating an uncoupled design.

|  |  | DP0 | |
|---|---|---|---|
|  |  | DP1 | DP2 |
| FR0 | FR1 | X |  |
|  | FR2 |  | X |

Figure 6A:
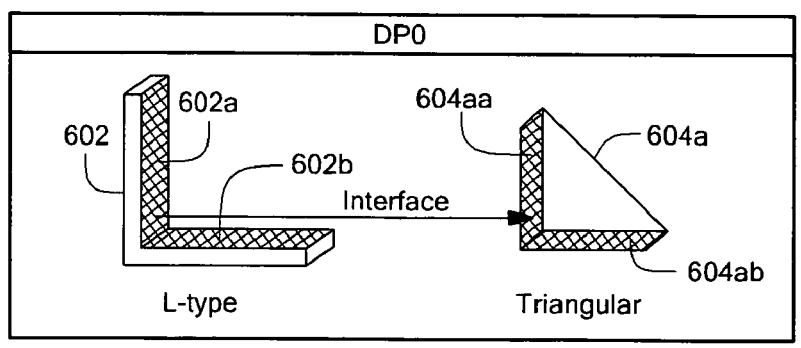
FIG. 6A is a pictorial showing identified interfaces between particular cells of the exemplary object of FIG. 6.

Referring now to FIG. 6A, in which like elements of FIG. 6 are shown having like reference designations, interfaces (similar to the interfaces in column 508 of FIG. 5) are established and are indicated pictorially. Two faces 602a, 602b of the physical shape 602 are selected to interface to two faces 604aa, 604ab of physical shape 604a. The selection of interfaces corresponds to step 112 of FIG. 1.

Referring now to FIG. 6B, three topologies 620a, 620b, 620c are shown. Topology 620a can bee seen to be a combination of the physical shapes 602 and 604a of FIG. 6. Topology 620b can bee seen to be a combination of the physical shapes 602 and 604b of FIG. 6. Topology 620c can bee seen to be a combination of the physical shapes 602 and 604c of FIG. 6. Each of the topologies 620a-620c meets all of the DPs and FRs. Construction of the candidate topologies 620a-620c corresponds to step 116 of FIG. 1.

Referring now to FIG. 6C, a physical shape 630a corresponds to the physical shape 620a of FIG. 6B. The size of a rib 632 is scaled in the shape 630a to provide a shelf having a dimension D upon which objects can hang. FIG. 6C represents a determination of a final shape, as described in association with the step 118 of FIG. 1.

A design matrix 636 includes FRs and corresponding DPs associated with the physical shape 630a. The FRs and DPs are listed above in association with FIG. 6. The design structure matrix 634 indicates a decoupled design.

The candidate physical shape 630a has the decoupled design matrix 634 because the L-type beam affects the stiffness of the hanger, but the triangular rib does not affect FR1, (hang a load). The length D should be greater than a certain length to keep the space to hang a load on the beam in the candidate physical shape 630a.

Referring now to FIG. 6D, a physical shape 650a corresponds to the physical shape 630a of FIG. 6B. The size of a rib 652 is scaled in the shape 650a to not provide a shelf upon which objects can hang.

A design matrix 654 includes FRs and corresponding DPs associated with the physical shape 650a. The FRs and DPs are listed above in association with FIG. 6. The design matrix 654 indicates a coupled design.

The candidate physical shape 650a has the coupled design matrix 654 in which DP2 affects FR1, i.e. the rib of DP2 effects FR1, to hang a load. In this case, both FRs cannot be satisfied, because FR1 cannot be satisfied, i.e., nothing can hang on the physical shape 650a.

Figure 7:
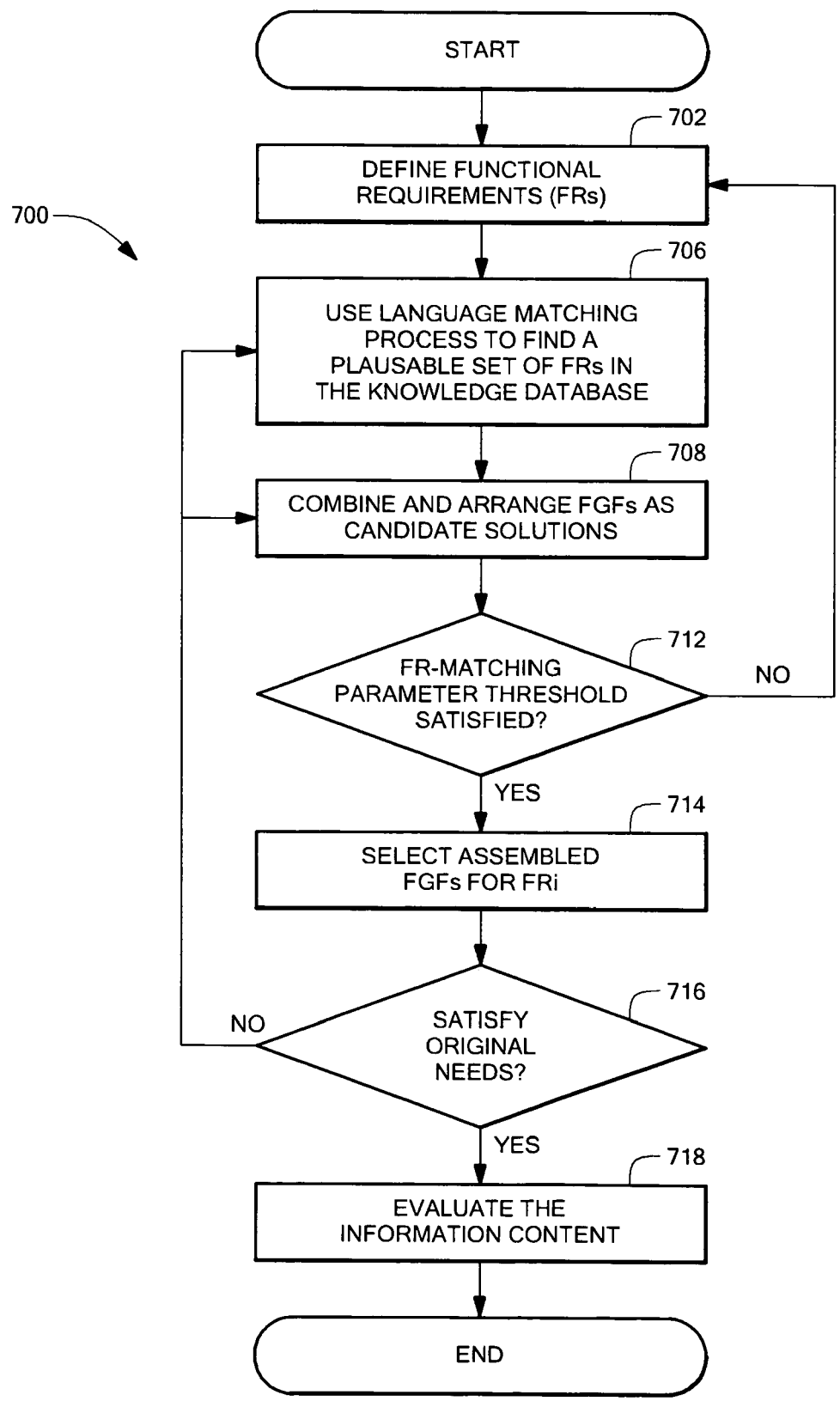
FIG. 7 is a flow diagram of a process to retrieve information from a knowledge base.

Referring now to FIG. 7, a process 700 for generating a design matrix begins in processing block 702 in which FRs are defined. Once the FRs are defined, they can be decomposed.

A query FR and a given saved FR can be decomposed into a set of words and pairs of words. For example, the phrase "engage the pawl to the engaged position," can be decomposed into two sets as Word set ={engage, pawl, to, engaged, position}

Word pair set {(engage, pawl), (pawl, to), (to, engaged), (engaged, position)}.

Here, 'the,' 'a,' 'and,' 'or,' and pronouns are trimmed, because the word is not closely related to the meaning of the sentence. The word set is used to check all the words of the query FR are included in the given saved FR. The word pair set is used to check the sequence of the matched words. When the words are compared, synonyms of a certain English word are checked via a thesaurus or synonym dictionary, which may be provided as an electronic thesaurus or synonym dictionary such as WordNet, for example.

Processing next proceeds to processing block 706 in which a language matching algorithm is used to search a knowledge database for potential FRs. The knowledge database can be provided, for example, in the manner described above in conjunction with step 122 of FIG. 1. An FR-matching quality parameter (referred to as an FR metric) is computed for each potential FR. The metric can be computed as:

$$\text{FR\_metric} = \frac{2 \times \text{\# of matched words} + \text{\# of matched word pairs of saved } FR}{\text{\# of total words} + \text{\# of matched word pairs of input } FR} \tag{a}$$

Once two sentences for a query FR and a given saved FR are exactly the same, this metric provides a value of gives 100%. If not, the metric scales the difference by the mathematical equation defined for the metric. Thus, in one embodiment, the similarity between FR statements is calculated using a value defined in an FR metric between 0.0 and 1.0 Synonym checking reduces errors of describing a meaning of a word using synonyms.

In one embodiment, a computer aided design (CAD) engine searches a plausible set of DPs and FGFs by language matching between input an FR and FRs stored in the knowledge database. The search of design solutions can be performed by text analysis of FRs, however, other techniques may also be used.

In one embodiment, the language matching of FRs can be accomplished as follow. Once a designer inputs a query FR, a computer algorithm searches similar FRs to the query FR in the FR-database portion of the knowledgebase. If the language description of the query FR has similarity to an FR1 of hierarchy "A" and an FR2 of hierarchy "B" already stored in the case base, "DP1_A" and "DP2_B" can be thought of as different design solutions to satisfy the query FR. For one FR, many DPs can be found out as candidate solutions through this search process in the databases. The mapping between the query FR (FR0) and many candidate DPs can be expressed as fr-dp("FR0", ["DP1_A", "DP2_B", . . .])

Each DP related to geometric entities is also linked to each FGF. Each FGF is defined by a set of nodes in the face-edge graph that represent a set of faces in the solid model. Thus, the representation of the mapping between FR0 and many candidate solutions related to geometric entities can be expressed as fr-dp-geometry("FR0", [{"DP1_A", "FGF1_A"}, {"DP2_B", "FGF2_B"}, ... ]).

One difference in the structure of the database explained in this patent application from the database of a Thinking Design Machine is a tree structure of the knowledge base and the hierarchical information flow. This hierarchical information flow is a more compact way to store design knowledge, because all the lower level branches from a certain FR can be searched and extracted.

Search of the proper DPs from given FRs can be performed via a statistical approach. The statistical approach measures the similarity between an FR already stored in the database and a query FR. The similarity is calculated by the frequency of appearing words and the sequence of words. This similarity can be used in the computation of the FR metrics.

Once the FR metrics are computed, then as shown in decision block 712, a determination is made as to whether an FR matching parameter threshold has been satisfied. If the FR-matching-quality parameter threshold has not been satisfied, then processing returns to processing block 702 and the processes of processing blocks 702-710 are repeated until the FR-matching parameter threshold is satisfied.

Once the FR-matching-quality-parameter threshold is satisfied, processing proceeds to processing block 714 in which assembled FGFs are selected for an FR. Processing then proceeds to decision block 716 in which a determination is made as to whether original needs (i.e., the FRs) are satisfied. If the original needs are not satisfied then processing can return to either block 706 or block 708. If the original needs are satisfied, then processing proceeds to block 718 where the information content (as that term is defined herein above) is evaluated.

Thus, if a designer uses the above described technique, many candidate shapes are generated and ranked with values of FR_metric and INTERFACE_metric. In addition to the two metrics, the designer must construct design matrices for selected candidate shapes to check functional couplings. If constructed design matrices for some candidate shapes are decoupled or uncoupled, he can select the shapes as his design solution satisfying the independence axiom. If not, he must redefine his FR statements to expand his language search or search more FGFs by expanding the search scope to more databases.

Figure 8:
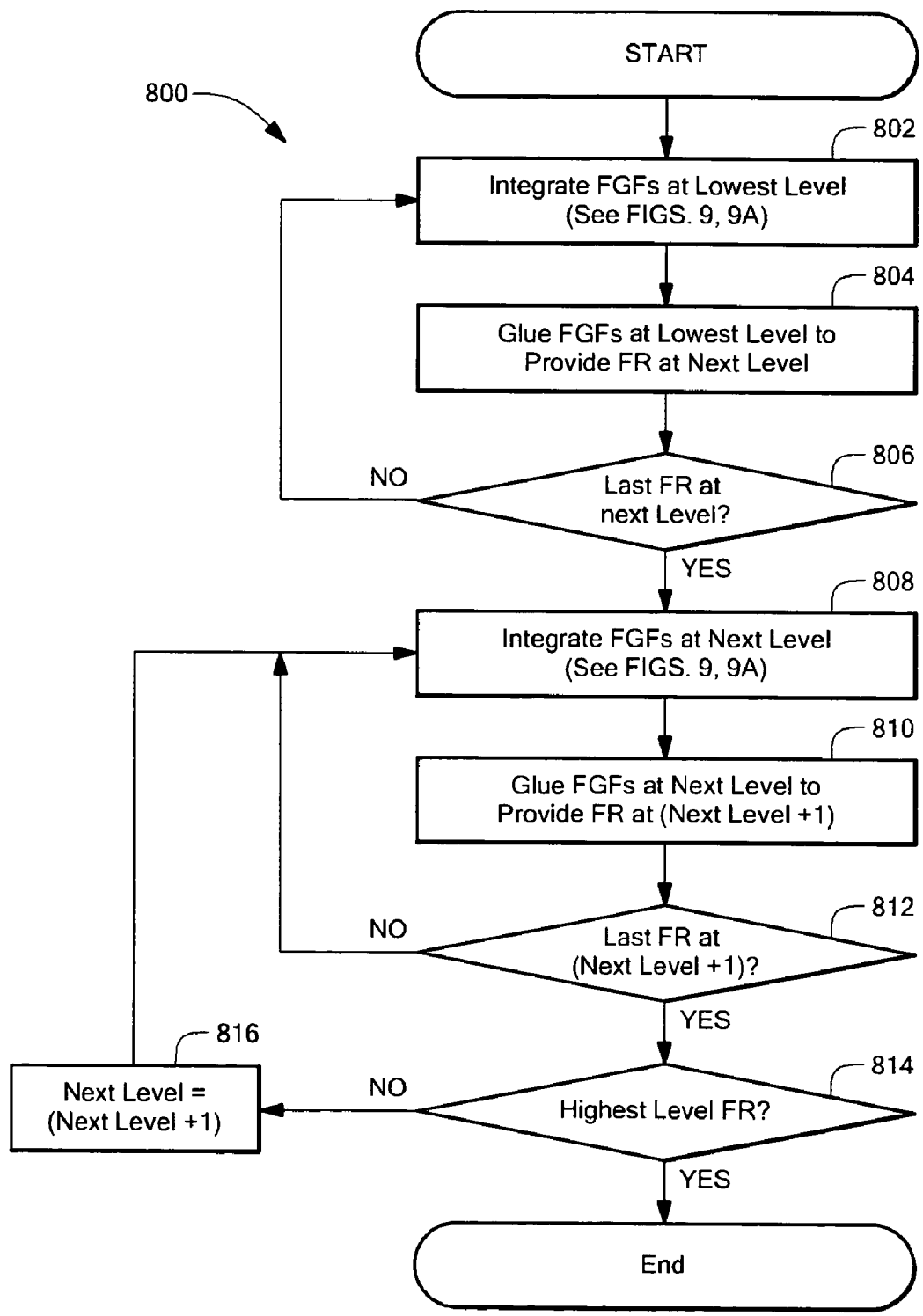
FIG. 8 is a flow diagram of a process for integrating functional geometric features.

Referring now to FIG. 8, a process 800 for integrating FGFs (also referred to as the process of assembled shape integration) is shown. The FGF integration process is generally described in steps 112 of FIG. 1 and FIG. 8 provides details of at least portions of the general process. Processing begins in processing block 802 in which FGFs are integrated, beginning at the lowest level of the FGF hierarchy. Integration of various FGFs to a complete shape is a factor for geometry design with FRs. To integrate FGFs, it is necessary to combine the candidate FGFs and check geometric interface-ability between them. In one embodiment, the combining of FGFs can be performed via a genetic algorithm (GA) and geometric interface-ability can be checked by an algorithm which simulates assembly operations to integrate the FGFs into a physical space. The following attributes are checked to quantify the interface-ability between FGFs. First, an interface type (IT) is checked by graph matching of interfacing nodes of FGFs. Graph matching is known as an NP-complete problem. Second, relative angles between faces are measured and third, the possibility of positioning mating faces is considered.

Each FGF is assigned one or more different IT attributes. Possible IT attributes include but are not limited to: (a) against:assembly; (b) against:rigid attachment; and (c), fits: assembly. Other FGF attributes can include but are not limited to: Angles between faces (AF) and Positions (Pos).

Processing next proceeds to processing block 804 in which the FGFs are combined or "glued" at the lowest level to provide an FR at the next level. Gluing fixes the integrated FGFs together.

Processing then proceeds to decision block 806 in which a determination is made as to whether the last FR at the next level has been processed. If a decision is made that the last FR has not been processed, then processing returns to step 802 and this loop is repeated until a determination is made that the last FR at the next level has been processed.

Once it is determined that the last FR at the next level has been processed, processing then proceeds to step 808 in which FGFs are integrated at the next level.

Processing then proceeds to processing step 810 where FGFs are combined or glued at the next level to provide an FR at the yet next higher level.

Decision block 812 implements a loop in which the steps 808 and 810 are repeated (and thus FGFs are repeatedly integrated and combined) until a determination is made that the highest level FR has been reached as shown in decision block 814. Once the highest level FR has been processed, then processing ends.

In one example, assume that three sets of candidate FGFs to satisfy FR1, FR2, and FR3 are identified as FR1, FR2 and FR3 and that they these candidate FGFs can be supposed as:

{
fr-dp-geometry ("FR1", [{"DP1_A"}, "FGF1_A"}, {"DP1_B", "FGF1_B"}]),
fr-dp-geometry ("FR2", [{"DP2_A", "FGF2_A"}, {"DP2_B", "FGF2_B"}, {"DP2_C", "FGF2_C"}]),
fr-dp-geometry ("FR3", [{"DP3_A", "FGF3_A"), {"DP3_C", "FGF3_C"}]),
}

In the above notations, "DP1_A" and "FGF1_A" mean DP1 and FGF1 in a design case named "A," and "DP2_B" and "FGF2_B" mean DP2 and FGF2 in a design case named "B." In this case, since FR1 and FR3 each have two members to the set and FR2 has three members, the number of possible combinations between the three FGFs FR1, FR2 and FR3 is twelve (computed as 2*3*2=12). For each possible combination, there are possible combinations of connectivity of the FGFs FR1, FR2, and FR3. If each FGF is assumed to have three interfaces, there are 16 cases of connectivity. This can be represented as a connectivity graph. In this example, there exists a total of 1044 possible combinations of connections between the three FGFs FR1, FR2, FR3 with three interfaces. If assembly sequence is considered in addition to the connections, the number of possible combinations will be increased.

Figure 9:
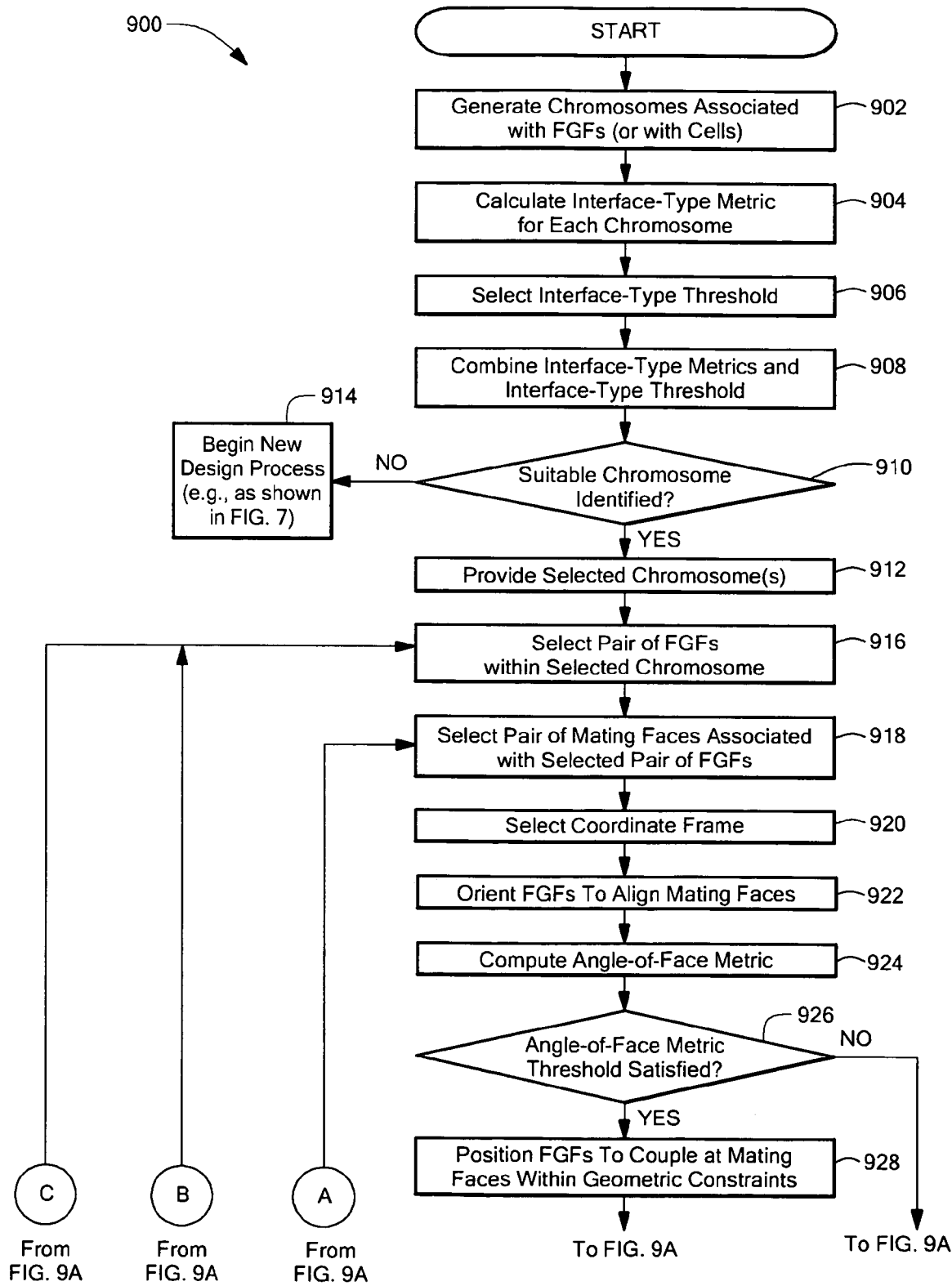
FIGS. 9 and 9A taken together form a flow diagram of a process for integrating functional geometric features.
Figure 9A:
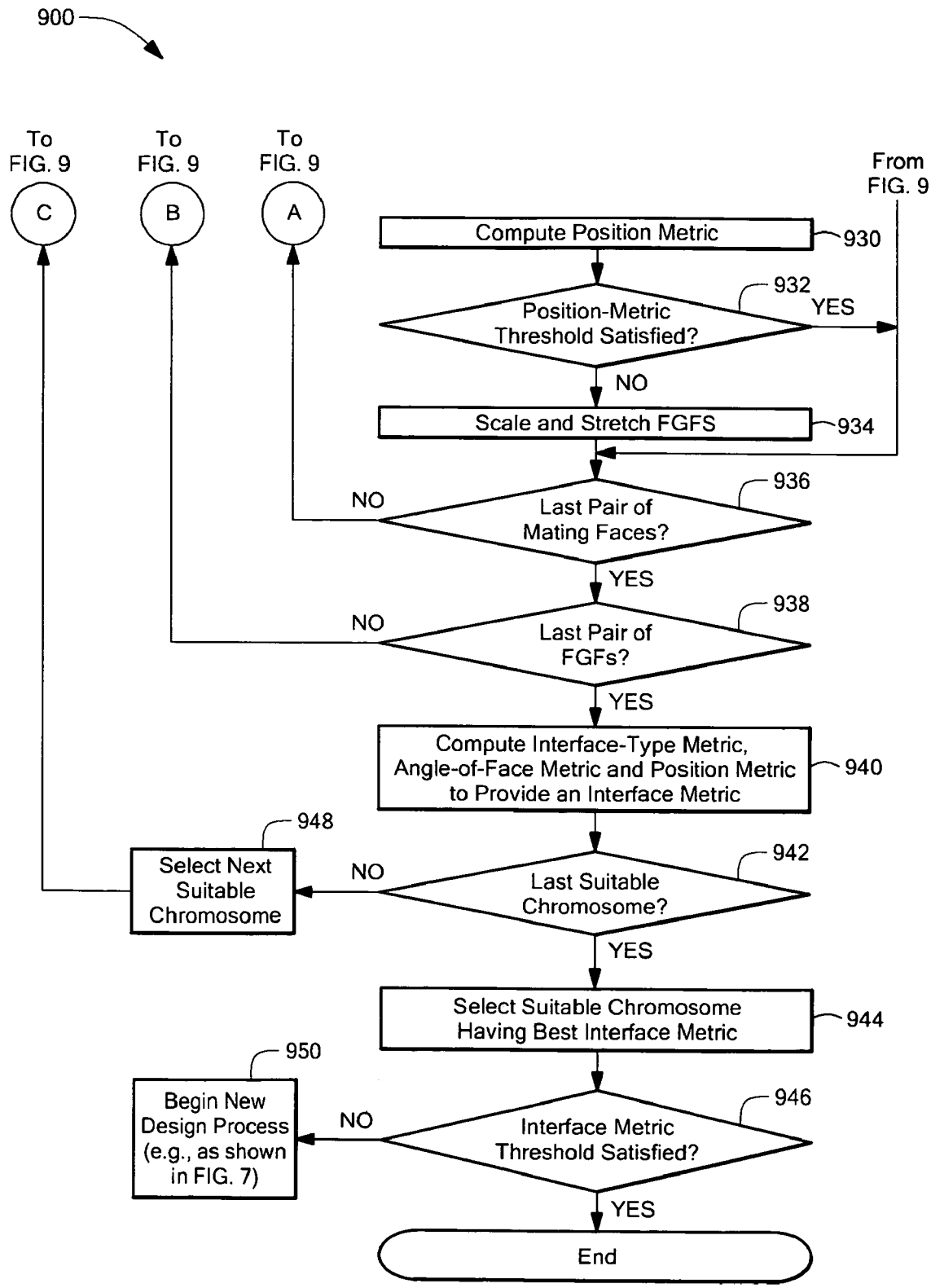

FIGS. 9 and 9A taken together correspond to a flow diagrams, which illustrates the steps to combine and assemble retrieved FGFs. One of ordinary skill in the art may choose to utilize hardware or software (or a combination of hardware and software) to automatically perform such steps. In general overview, a searching technique is used to search for an acceptable combination for matching the geometric interface and generating assembly sequences.

In one embodiment a Genetic Algorithm (GA) is used in the searching technique. A GA was selected since there are a lot of possible combinations for interfacing FGFs and use of the GA avoids the need for checking all the combinations instead of using an algorithm for generating all the combinations. The GA has been proved to be a useful tool for searching combinatorial solution space that has discrete numbers as design variables. GA evolution is also used to generate assembly sequences between FGFs and to find out combinations of mating faces, which are matched well based on the interface types. The GA can evolve to reduce the solution space with an acceptable speed to maximize the fitness.

In the GA embodiment, from the highest-valued chromosome, the technique automatically assembles FGFs by coordinating, orienting, and positioning with reference to given mating conditions and calculates geometric interface-ability to a value of INTERFACE_metric between 0 and 1. The INTERFACE_metric is multiplications of three metrics for interface types, for relative orientations between mating faces, and for possibility to position mating faces. The higher the values of FR-metric and INTERFACE_metric, the better the generated design solution for the given FRs that must be satisfied. The V-model design process of top-down decomposition and bottom-up integration reduces the number of possible combinations of interfacing FGFs.

The technique of the present invention provides designers with a design environment for designing geometric artifacts from functional descriptions. A number of FRs, DPs, and FGFs can be related and collected in databases and they can be automatically assembled to generate candidate shapes from language descriptions of their functional requirements.

In accordance with the present invention, a method, which provides a solution to reuse the CAD models by incorporating FRs into the CAD models in a manageable computational complexity is provided. It is expected that the techniques of the present invention, by considering different combinations of pre-defined FGFs from given FRs, may create shapes that human designer did not consider.

Turning now to FIGS. 9 and 9A which together comprise a flow diagram 900 which illustrates a process for integrating a specific FGF (e.g. as shown in steps 802, 808 of FIG. 8), processing begins in step 902 in which chromosomes associated with FGFs (or with cells) are generated.

A GA chromosome can be defined as

| FGFs: | 1_A | 2_A | 2_A | 3_A | 3_A | 1_A |
|---|---|---|---|---|---|---|
| Chromosome: | 2 | 0 | 2 | 3 | 4 | 6 |
| Interface pairs: | Pair1 | | Pair2 | | Pair3 | |

The interface pair represents connections and assembly sequences between two FGFs shown on the top of the chromosome. Each interface pair consists of two genes, which are mapped to the encoded mating faces of an FGF. The first FGF in a pair is a base FGF, which is fixed in the physical space for the assembling operation. The second FGF is an interfacing FGF, which is moved and deformed to be interfaced to the base FGF.

The number of pairs is determined by $_mC_2=n$, where m is the number of FGFs. Here, the number of pairs in the example chromosome is $_3C_2=3$. Table 4 below shows the encoding of mating faces according to each FGF (i.e. the encoding of interfaces of FGFs into genes). Each FGF is supposed to have three mating faces. The codes are generated by combinations of three mating faces in each FGF and are represented as a number in the gene. A number for each FGF is 0, or between 1 and 7. The maximum number of codes for each FGF is determined by $_mC_1+_mC_2+\ldots+_mC_m$. Thus, the chromosome with codes (2 0 2 3 4 6) represents one possibility of the eleventh connectivity graph and a corresponding assembly sequence. In this example, each pair can have any two numbers between 0 and 7. If 0 is selected for a gene in a pair, there is no connection between two FGFs in the pair.

TABLE 4

| FGF | Code | Mating faces |
|---|---|---|
| | 0 | Null |
| 1_A | 1 | A |
| | 2 | B |
| | 3 | C |
| | 4 | A & B |
| | 5 | B & C |
| | 6 | C & A |
| | 7 | A & B & C |
| 2_A | 1 | D |
| | 2 | E |
| | 3 | F |
| | 4 | D & E |
| | 5 | E & F |
| | 6 | F & G |
| | 7 | D & E & F |
| 3_A | 1 | G |
| | 2 | H |
| | 3 | I |
| | 4 | G & H |
| | 5 | H & I |
| | 6 | I & G |
| | 7 | G & H & I |

Processing then proceeds to step 904 in which an interface type metric (IT_metric) for each chromosome is calculated. Based on the chromosome with codes (2 0 2 3 4 6), combinations of mating faces and assembly sequences are generated as shown in Table 5 (i.e., 2 0 Table 5 shows the combinations of mating (or interfacing) faces and the assembly sequences of FGFs represented by a chromosome (2 0 2 3 4 6)). The sequence of the genes represents assembly sequences of FGFs. There exists only one possible combination of mating faces between FGF_2 and FGF_3. It is to interface E and I. However, there are two combinations of mating faces between FGF_3 and FGF_1 as shown in Table 5. The assembly sequences of mating faces in a pair are not considered. it means that either assembly sequence of mating faces, G:C →H:A or H:A→G:C is arbitrarily selected for checking geometric interface-ability.

TABLE 5

| FGF1 | FGF_2 | FGF_2 | FGF_3 | FGF_3 | FGF_1 |
|---|---|---|---|---|---|
| 2 | 0 | 2 | 3 | 4 | 6 |
| NO INTERFACE | | E:I | | G:C & H:A | |
| | | | | H:C & G:A | |

Through the GA evolutions, the fitness of interface type (IT) matching between FGFs can be ranked. The high fitness valued chromosome represents the high possibility of interface type matching of the mating faces between all the FGFs. The value, 1.0, is assigned for the fitness, if interface types of all the mating faces of the FGFs are completely matched each other. The fitness can be represented as $$\text{fitness} = \text{IT\_metric} = \frac{2 \times \text{\# of matched } ITs}{\text{\# of mating faces}} \qquad (b)$$

After finishing GA evolution, a shape integration algorithm checks the geometric interface-ability between FGFs from the highest valued chromosome, and generates assembled shapes based on the mating conditions and the generated assembly sequences by GA evolution. The highest fitness valued chromosome has the highest possibility to geometric interface-ability of FGFs, because it gives the best combinations for interface type matching. The fitness values, already decided by GA, are degraded, or maintained by checking geometric interface-ability. The geometric interface-ability between FGFs is quantified as INTERFACE_ metric. Thus, if all the mating faces of all the FGFs are completely assembled in the physical space satisfying all the mating conditions, the INTERFACE_metric gives a value of 10.0. If no mating faces can be interfaced, the INTERFACE_ metric value will be 0.0.

In the above example with three FGFs (i.e., FR1, FT2, FR3), when four pairs of mating faces can be interfaced in nine mating faces, the maximum value of the interface metric can be computed as 2×4/9=0.89.

Processing next proceeds to step 906 in which an interface type threshold is selected and in step 908 the IT metric and interface type threshold are combined.

In decision block 910, a determination is made as to whether a suitable chromosome has been identified. If a suitable chromosome has not been identified, processing proceeds to block 914 and a new design process as shown in FIG. 7 is begun. If, on the other hand, a suitable chromosome has been identified, then processing proceeds to step 912 in which the selected chromosomes are provided.

The process of automatic assembly and interface-ability of FGFS is next described in conjunction with steps 916-950. The goal of the shape integration process is to check geometric interface-ability between FGFs satisfying given mating conditions based on the assembly sequences given from the highest valued chromosomes and finally to quantify the degree of the interface-ability as a value of INTERFACE_metric. This shape integration process has been implemented as computer algorithms that emulates human assembling operations and solves assembly constraint equations using MATLAB. The steps of this process follow the flow chart as shown in FIGS. 9 and 9A.

In general overview, the basic strategy is checking the mating conditions by orientating and positioning of FGFs in a given coordinate frame. Here, orienting means only rotations of FGFs to match directions of mating faces, and positioning means only translations of FGFs to locate the mating faces to the given position. The first FGF in a pair of a chromosome is a base part that is fixed in the absolute coordinate frame. The second FGF is an interfacing part to the base FGF.

The algorithm brings chromosomes sequentially from the highest value to the lower value. In a chromosome, all the combinations of mating faces are generated according to the codes of the genes. For example, there are two combinations of interfacing mating faces in the example chromosome in section 5.2.1. If the codes of the chromosome are (2 0 4 6 4 6) according to the codes in Table 4, then there are four combinations of interfacing mating faces as shown in Table 6. There are two pairs of mating faces in pair 2 and 3 of FGFs.

TABLE 6

| Sequence | FGF1 | FGF_2 | FGF_2 | FGF_3 | FGF_3 | FGF_1 |
|---|---|---|---|---|---|---|
| | 2 | 0 | 4 | 6 | 4 | 6 |
| 1 | No interface | | D:I -> E:G | | G:C -> H:A | |
| 2 | No interface | | D:G -> E:I | | G:C -> H:A | |
| 3 | No interface | | D:I -> E:G | | H:C -> G:A | |
| 4 | No interface | | D:G -> E:I | | H:C -> G:A | |

The technique of the present invention recursively brings $i^{th}$ sequence (i=1, 2, 3, 4) and $j^{th}$ pair (j=1, 2, 3) in a chromosome, and $k^{th}$ interfacing pair of mating faces (k=1, 2) in pair 2 and pair 3 until all the combinations have been checked. In a pair, the first FGF is fixed as a base part and the second FGF is being interfaced to the first FGF to satisfy pre-defined mating conditions. Each FGF has its local coordinate frame. Thus, the first step of assembling operations is to locate the local coordinate frame with respect to the absolute coordinate frame commonly used for the whole assembling operations. This is referred to herein as "coordinating."

Once the coordinating operation has been performed, the algorithm rotates the second FGF to match orientation of its mating face with that of the base FGF. This operation is referred to herein as "orienting." Then, it translates the second FGF to locate its mating face to a position provided by assembly constraints. This operation is referred to herein as "positioning." All the operations are performed based upon the local coordinate frame and the corresponding degrees of freedom (DOFs). The mating conditions can be interpreted as assembly constraints described by mathematical equations.

For the example of Table 6, the technique recursively brings assembly sequences, and automatically assembles the three FGFs. In sequence 1, it brings $2^{nd}$ pair of FGFs first, because there is no interface between FGF1 and FGF2. Then, it brings $1^{st}$ pair of mating faces, D:I. It firstly locates the local coordinate frames of the FGF2 and the FGF3 coincidently with the absolute coordinate frame. Then, it rotates the FGF3 to a direction to match the orientation of I with that of D according to the given interface type. In the orienting operation, unit normal vectors of two planar mating faces must be parallel and opposite for 'against' and two centerlines must be parallel for 'fits'. The angle differences between mating faces are calculated for AF_metric. It translates the FGF3 for positioning I to D after orienting operations and calculation of values for AF_metric. In the positioning operation, a point on the planar mating face must be on the other planar mating face for 'against' and two centerlines must be located on a line for 'fits'. If scaling or stretching is needed, it is performed. If it fails positioning FGF3, it gives a defined value (0.5 in this paper) less than 1.0 for Pos_metric. The algorithm output position and orientation of a local coordinate frame with respect to the absolute coordinate frame, in which the FGF3 can move further with DOFs calculated through the assembling operations. It recursively checks the interface-ability of the second pair of mating faces, E:G, and then do the same steps for $3^{rd}$ pair of FGFs (FGF3 and FGF1). Finally, three values of IT_metric determined by GA evolutions, AF_metric, and Pos_metric are multiplied as a value of INTERFACE metric, which represents the geometric interface-ability for a given sequence in a chromosome. The value of the INTERFACE_ metric has scaled between 0.0 and 1.0. A value of 1.0 means complete interface-ability for the given FGFs and 0.0 means that any of the given FGFs cannot be interfaced. Consequently, the proposed technique produces the assembled shapes and degrees of freedoms of each FGF in the assembled shape, and ranks the assembled shapes by values of INTERFACE_metric, which represent degrees of interface-ability of FGFs in the assembled shapes.

Turning now to FIG. FIGS 9 and 9A, in step 916, a pair of FGFs within a selected chromosome are selected and processing then proceeds to step 918 in which a pair of mating faces associated with the selected pair of FGFs is also selected. In step 920, a coordinate frame is selected. In steps 922 and 924, the FGFs are oriented to align mating faces and an angle-of-face-metric (AF metric) is computed.

Processing then proceeds to decision block 926 in which a determination is made as to whether an angle-of-face-metric threshold has been satisfied. If the angle-of-facemetric threshold has been satisfied, the processing proceeds to steps 928-934 where FGFs are positioned to couple mating faces within the geometric constraints which have been identified, a position matrix as computed and a determination is made as to whether a position-metric threshold has been satisfied as shown in step 932. If the position metric threshold has not been satisfied, then processing proceeds to step 934 where the FGFs are scaled and stretched. If, on the other hand, the position metric threshold has been satisfied, then processing 934 is skipped and processing directly to decision block 936.

If in decision block 926, a decision is made that the angle-of-face-metric threshold has not been satisfied, then processing jumps to decision block 936 in which a determination is made as to whether a last pair of mating facing is being considered.

If in decision block 936, a decision is made that a last pair of mating faces is not being considered, then processing returns to step 918 and steps 918-934 are repeated until a determination is made that a last pair of mating faces is being considered.

Once in decision block 936 a determination is made that the last pair of mating faces is being considered, then processing proceeds to decision block 938, in which it is determined whether the last pair of FGFs is being processed. Decision block 938 implements a loop in which steps 916-936 are repeated until the last pair of FGFs has been considered. Once in decision block 938, it is determined that the last pair of FGFs has been considered, then processing proceeds to step 940, in which the interface-type metric, angle-of-face-metric and position metric are combined to provide an interface metric (INTERFACE_metric). Processing then proceeds to decision block 942 in which a determination is made as to whether the last suitable chromosome has been considered. If the last suitable chromosome has been considered, then processing proceeds to decision block 944 in which the next suitable chromosome is selected. If the last suitable chromosome has not been considered, a new chromosome is selected at step 948, processing returns to step 916, and steps 916-940 are repeated until the last suitable chromosome has been considered.

Once a determination is made in decision block 942 that the last suitable chromosome has been considered, then processing proceeds to step 944 in which the chromosome having the best interface metric is selected.

Processing then proceeds to decision block 946 where a determination is made as to whether the interface metric threshold has been satisfied. If the interface metric threshold has not been satisfied, then processing proceeds to step 950 in which a new design process (e.g. as shown in FIG. 7) is begun. If, on the other hand, the interface metric threshold has been satisfied, then processing ends.

The above described "coordinating," "orienting," and "positioning." operations can be performed by a transformation matrix and the corresponding mathematical equations represented as follows.

$$T = \begin{bmatrix} n_x & o_x & a_x & p_x \\ n_y & o_y & a_y & p_y \\ n_z & o_z & a_z & p_z \\ 0 & 0 & 0 & 1 \end{bmatrix}, T_R = \begin{bmatrix} n_x & o_x & a_x & 0 \\ n_y & o_y & a_y & 0 \\ n_z & o_z & a_z & 0 \\ 0 & 0 & 0 & 1 \end{bmatrix}, T_T = \begin{bmatrix} 1 & 0 & 0 & p_x \\ 0 & 1 & 0 & p_y \\ 0 & 0 & 1 & p_z \\ 0 & 0 & 0 & 1 \end{bmatrix}, \quad (c)$$

, where $T_R$ denotes only rotation and $T_T$ denotes only translation. The elements of $T_R$ matrix always have the following relations represented as six mathematical equations.

$$n_x^2 + n_y^2 + n_z^2 = 1$$

$$o_x^2 + o_y^2 + o_z^2 = 1$$

$$n_x o_x + n_y o_y + n_z o_z = 0$$

$$a_x = n_y o_z - n_z o_y$$

$$a_y = o_x n_z - n_x o_z$$

$$a_z = n_x o_y - n_y o_x \quad (d)$$

DOFs are represented by $T_R(n)$ or $T_T(n)$. Here, n is a number less than or equal to three which represent degrees of freedom for rotation or translation. If an FGF has $[T_R(1), T_T(2)]$, it has one degree of freedom (DOF) for rotation and two DOFs for translation.

The scaling or stretching of step 934 is performed for special cases to show its effects to generating assembled shapes. The effects or importance of scaling or stretching will be discussed in a later section. An FGF is originally created with its own purpose. Thus, the more the shape of the FGF deforms, the more its purpose is lost. In this sense, only the severe shape deformation is not allowed, but scaling or stretching is performed. Here, scaling of shapes is enlarging or reducing the size of the shapes in all directions in the physical space and stretching is doing it in one direction. The basic scaling matrix is a special form of the transformation matrix, which is $$D = \begin{bmatrix} S_x & 0 & 0 & 0 \\ 0 & S_y & 0 & 0 \\ 0 & 0 & S_z & 0 \\ 0 & 0 & 0 & 1 \end{bmatrix} \quad (e)$$

where $S_x$, $S_y$, and $S_z$ are scaling factors. If all $S_x$, $S_y$ and $S_z$ are equal, this matrix can be used for scaling. Otherwise, one of $S_x$, $S_y$, and $S_z$ is not zero, it is used for stretching.

The coordinating of step 920 is an operation to determine a base coordinate frame in which the interfacing FGF can be rotated and translated. A proper coordinate frame is determined from the previous assembling operation, because the assembling operations are procedural and reduce DOFs of the interfacing FGF in this paper differently from the approach in. The more mating faces between two FGFs exist, the possibility of less DOFs will be increased. A base coordinate frame must be attached to a proper position with proper orientations to correctly represent rotation and translation of the interfacing FGF for the next assembling operation. There are mainly three types of base coordinate frames used in the shape integration process.

Coordinate_absolute: an absolute coordinate frame, which is attached and fixed to the ground.

Coordinate_against: a base coordinate frame which is attached to the point on the first planar mating face of the base FGF that has been already interfaced by an assembling operation of 'against' type. The z-axis is coincident with the unit normal vector of the first mating face of the base FGF, $N_{b1}$, which has been already used for interface. The y-axis follows an intersection line of two mating planes of the base FGF. The origin is any point on the planar mating face of the base FGF.

$$\hat{z}^B = \hat{N}_{b1}^A$$

$$\hat{y}^B = \frac{\hat{z}^B \times \hat{N}_{b2}^A}{|\hat{z}^B \times \hat{N}_{b2}^A|}$$

$$\hat{x}^B = \hat{y}^B \times \hat{z}^B$$

Coordinate_fits: a base coordinate frame which is attached to the point of the centerline, $C_{b1}$, of the base FGF that has been already interfaced by an assembling operation of 'fits' type. The point is common for both a cylinder and a hole. The z-axis is coincident with the centerline of the first mating face of the base FGF, which has been already used for interface.

$$\hat{z}^B = \frac{\vec{C}_{b1}^A - \vec{C}_{b2}^A}{|\vec{C}_{b1}^A - \vec{C}_{b2}^A|}$$

A transformation matrix from an absolute coordinate frame to a base coordinate frame is obtained by the following method.

Coord_abs_base( ) {

$\hat{x}^A = (1,0,0), \hat{y}^A (0,1,0), \hat{z}^A = (0,0,1), \vec{O}^A = (0,0,0)$ $\hat{x}^B = [T_{RC}^B]\hat{x}^A, \hat{y}^B = [T_{RC}^B]\hat{y}^A, \hat{z}^B = [T_{RC}^B]\hat{z}^A$ $\vec{O}^B = [T_{TC}^B]\vec{O}^A$ $[T_C^B] = [T_{TC}^B][T_{RC}^B]$

}

The orienting operation of step 922 only rotates the interfacing FGF to match a direction of its mating face with a direction of the other mating face of the base FGF according to the given mating conditions. The followings are the methods necessary for the orienting operations. The superscript denotes a coordinate frame. Here, 'A' is the absolute coordinate frame, 'B' is a base coordinate frame, Lb is the original local coordinate frame of the base FGF, and Li is the original local coordinate frame of the interfacing FGF.

Orienting_against ($T_R(3)$) {

Inputs: $\hat{N}_b^{Lb}, \hat{N}_i^{Li}$

Outputs: $[T_{Ri}^A]$

Equations: equations (d), and $\hat{N}_b^A = [T_b^A]\hat{N}_b^{Lb}$ $\hat{N}_i^A = [T_{Ri}^A]\hat{N}_i^{Li}$ $\hat{N}_i^A = -\hat{N}_b^A$ (f)

where $N_b$ is a unit normal vector of a mating face of a base FGF and $N_i$ is a unit normal vector of a mating face of an interfacing FGF.

}

Orienting_fits ($T_R(3)$) {

Inputs: $\vec{C}_{b1}^{Lb}, \vec{C}_{b2}^{Lb}, \vec{C}_{i1}^{Li}, \vec{C}_{i2}^{Li}$ Outputs: $[T_{Ri}^A]^{(1)}$ or $[T_{Ri}^A]^{(2)}$ Equations: equations (d), and $\vec{C}_{b1}^A = [T_b^A]\vec{C}_{b1}^{Lb}$ $\vec{C}_{b2}^A [T_b^A]\vec{C}_{b2}^{Lb}$ $\vec{C}_{i1}^A = [T_{Ri}^A]\vec{C}_{i1}^{Li}$ $\vec{C}_{i2}^A = [T_{Ri}^A]\vec{C}_{i2}^{Li}$ (g)

$(C_{i2,x}^A - C_{i1,x}^A)/(C_{b2,x}^A - C_{b1,x}^A) = (C_{i2,y}^A - C_{i1,y}^A)/(C_{b2,y}^A - C_{b1,y}^A) = (C_{i2,z}^A - C_{i1,z}^A)/(C_{b2,z}^A - C_{b1,z}^A)$ (1)

$(C_{i1,x}^A - C_{i2,x}^A)/(C_{b2,x}^A - C_{b1,x}^A) = (C_{i1,y}^A - C_{i2,y}^A)/(C_{b2,y}^A - C_{b1,y}^A) = (C_{i1,z}^A - C_{i2,z}^A)/(C_{b2,z}^A - C_{b1,z}^A)$ (2)

where C is a point on the centerline of a cylindrical surface. $C_{b1}$ and $C_{b2}$ are two points on the centerline of a base FGF and $C_{i1}$, and $C_{i2}$ are two points on the centerline of an interfacing FGF.

}

Orienting_any ($T_R(1)$) {//rotation about z axis, $\hat{z}^B$, in a base coordinate frame Inputs: $\hat{N}_b^B, \hat{N}_i^B$ Outputs: $[T_{Ri}^B]$ Equations:

$$\begin{bmatrix} -\dfrac{N_{b,x}^B}{\sqrt{(N_{b,x}^B)^2 + (N_{b,y}^B)^2}} \\ -\dfrac{N_{b,y}^B}{\sqrt{(N_{b,x}^B)^2 + (N_{b,y}^B)^2}} \end{bmatrix} = \begin{bmatrix} \cos\theta & -\sin\theta \\ \sin\theta & \cos\theta \end{bmatrix} \begin{bmatrix} \dfrac{N_{i,x}^B}{\sqrt{(N_{i,x}^B)^2 + (N_{i,y}^B)^2}} \\ \dfrac{N_{i,y}^B}{\sqrt{(N_{i,x}^B)^2 + (N_{i,y}^B)^2}} \end{bmatrix}$$ (h)

$$[T_{Ri}^B] = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

where $N_b$ is the unit normal vector of the mating face of the base FGF and $N_i$ is the unit normal vector of the mating face of the interfacing FGF.

Originally, a rigid body has three rotational DOFs in 3-dimensional spaces. To satisfy a pre-defined interface type, 'against' or 'fits' in the orienting operations, orienting_against ($T_R(3)$) or orienting_fits ($T_R(3)$) are used. Orienting_against ($T_R(3)$) receives unit normal vectors of the mating faces as inputs and calculates a rotational transformation matrix. (f) has 6 equations for 12 unknowns. Additional 6 equations are provided by (d). Orienting_fits ($T_R(3)$) receives two points on a centerline and two points on the other centerline, and calculates two rotational transformation matrices in two different cases. In the first case, a direction of a vector from $C_{b2}$ to $C_{b1}$ is the same as that of a vector from $C_{i2}$ to $C_{i1}$. In the second case, both directions are opposite. For both cases, (g) have 9 equations for 15 unknowns. (d) are the additional 6 equations.

Once 'against' or 'fits' has been applied, the rotational DOFs is reduced to one for all the cases. The rotational axis for the remaining DOF is defined as z-axis of the base coordinate frame, coordinate_against or coordinate_fits. From the second pair of mating faces, the interfacing FGF rotates about the z-axis.

The positioning operation of steps 934/936 only translate the interfacing FGF to locate it on the correct position by which the given mating conditions are satisfied. The followings are the methods for the positioning operations based on the DOFs given from the preceded assembling operations.

Positioning_against ($T_T(3)$) {

Inputs: $\hat{N}_b^{Lb}$, $\vec{P}_b^{Lb}$, $\vec{P}_i^{Li}$, $[T_{Ri}^A]$

Outputs : $[T_{Ti}^A]$

Equations:

$\hat{N}_b^A = [T_b^A]\hat{N}_b^{Lb}$ $\vec{P}_b^A = [T_b^A]\vec{P}_b^{Lb}$ $\vec{P}_i^A = [T_{Ti}^A][T_{Ri}^A]\vec{P}_i^{Li}$ $\vec{P}_i^A = \vec{P}_b^A$ where $P_b$ is a point on a mating face of a base FGF and $P_i$ is a point on a mating face of an interfacing FGF.
}

Positioning_fits ($T_T(3)$) {

Inputs: $\vec{C}_{b1}^{Lb}$, $\vec{C}_{i1}^{Li}$, $\vec{C}_{i2}^{Li}$, $[T_{Ri}^A]^{(1)}$, $[T_{Ri}^A]^{(2)}$ Outputs: $[T_{Ti}^A]^{(1)}$, $[T_{Ti}^A]^{(2)}$ Equations:

$\vec{C}_{b1}^A = [T_b^A]\vec{C}_{b1}^{Lb}$ $\vec{C}_{i1}^A = [T_{Ti}^A]^{(1)}[T_{Ri}^A]^{(1)}\vec{C}_{i1}^{Li}$ or
$\vec{C}_{i1}^A = [T_{Ti}^A]^{(2)}[T_{Ri}^A]^{(2)}\vec{C}_{i1}^{Li}$ $\vec{C}_{i1}^A = \vec{C}_{b1}^A$ (k)

where C is a point on the centerline of a cylindrical surface. $C_{b1}$ is a point on the centerline of a base FGF and $C_{i1}$ and $C_{i2}$ are two points on the centerline of an interfacing FGF. (1) or (2) is either case of orienting.
}

Positioning_against ($T_T(2)$) {

Inputs: $\hat{N}_b^A$, $\vec{P}_b^A$, $\vec{P}_i^A$, $[T_C^B]$, $[T_{Ri}^B]$

Outputs $[T_{Ti}^B]$

Equations:

$\hat{N}_b^B = [T_{Ri}^B][T_C^B]\hat{N}_b^A$ (l)

$\vec{P}_b^B = [T_{Ri}^B][T_C^B]\vec{P}_b^A$

Plan: $N_{b,x}^B x + N_{b,y}^B y + N_{b,z}^B z + d = 0$ $d = -N_{b,x}^B P_{b,x}^B - N_{b,y}^B P_{b,y}^B - N_{b,z}^B P_{b,z}^B$ -continued $\vec{P}_i^B = [T_{Ti}^B]^*[T_{Ri}^B][T_C^B]\vec{P}_i^A$ $[T_{Ti}^B]^* = \begin{bmatrix} 1 & 0 & 0 & p_x \\ 0 & 1 & 0 & 0 \\ 0 & 0 & 1 & 0 \\ 0 & 0 & 0 & 1 \end{bmatrix}$ $N_{b,x}^B P_{i,x}^B + N_{b,y}^B P_{i,y}^B + N_{b,z}^B P_{i,z}^B + d = 0$ $[T_{Ti}^B] = \begin{bmatrix} 1 & 0 & 0 & p_x \\ 0 & 1 & 0 & p_y \\ 0 & 0 & 1 & 0 \\ 0 & 0 & 0 & 1 \end{bmatrix}$ where $P_b$ is a point on a mating face of a base FGF and $P_i$ is a point on a mating face of an interfacing FGF.
}

Positioning_fits ($T_T(2)$) {

Inputs: $\vec{C}_{b1}^A$, $\vec{C}_{b2}^A$, $\vec{C}_{i1}^A$, $\vec{C}_{i2}^A$, $[T_C^B][T_{Ri}^B]$ Outputs : $[T_{Ti}^B]$ Equations:

$\vec{C}_{b1}^B = [T_{Ri}^B][T_C^B]\vec{C}_{b1}^A$, $\vec{C}_{b2}^B = [T_{Ri}^B][T_C^B]\vec{C}_{b2}^A$ (m)

$\vec{C}_{i1}^B = [T_{Ri}^B][T_C^B]\vec{C}_{i1}^A$, $\vec{C}_{i2}^B = [T_{Ri}^B][T_C^B]\vec{C}_{i2}^A$ $\hat{z}^B \cdot \vec{P}_b^B = -p$ $\dfrac{\vec{C}_{b1}^B - \vec{C}_{b2}^B}{|\vec{C}_{b1}^B - \vec{C}_{b2}^B|} \cdot \vec{P}_b^B = 0$ $\hat{z}^B \cdot \vec{P}_i^B = -p$ $\dfrac{\vec{C}_{i1}^B - \vec{C}_{i2}^B}{|\vec{C}_{i1}^B - \vec{C}_{i2}^B|} \cdot \vec{P}_i^L = 0$ $\vec{P}_b^L = [T_{Ti}^L]\vec{P}_i^L$, $[T_{Ti}^L] = \begin{bmatrix} 1 & 0 & 0 & p_x \\ 0 & 1 & 0 & p_y \\ 0 & 0 & 1 & 0 \\ 0 & 0 & 0 & 1 \end{bmatrix}$ where $P_b$ is an intersection point vector between xy-plane and a centerline of the base FGF and $P_i$ is an intersection point vector between xy-plane and a centerline of the interfacing FGF.
}

Positioning_any ($T_T(1)$) {

Inputs : an axis, $\vec{P}_b^A$, $\vec{P}_i^A$, $[T_C^B]$, $[T_{Ri}^B]$

Outputs: $[T_{Ti}^B]$

Equations:

$\vec{P}_b^B = [T_{Ri}^B][T_C^B]\vec{P}_b^A$ $\vec{P}_i^B = [T_{Ti}^B][T_{Ri}^B][T_C^B]\vec{P}_b^A$ $P_{b,any}^B = P_{i,any} + p^{any}$ (n)

where $P_{any}$ is the vector component in a given axis of the base coordinate frame.

}

Originally, a rigid body has three translational DOFs in 3-dimensional space. To positioning FGFs with 3 DOFS, positioning_against ($T_T(3)$) or positioning_fits ($T_T(3)$) are used. Positioning_against ($T_T(3)$) receives input normal and input points on the planar mating faces of the FGFs and calculates a translational transformation matrix. Six equations in (j) are solved for 6 unknowns in this method. Positioning_fits ($T_T(3)$) coincides a point on the centerline of the interfacing FGF with that of the base FGF. Six unknowns can be solved using six equations in (k) for either case.

Positioning_against ($T_T(2)$) locates a point on the mating face of the interfacing FGF onto the plane on which the mating face of the base FGF lies. The interfacing FGF has two translational DOFs in x and y direction, once one 'against' assembling operation has been already performed. Because the second pair of the mating faces has been oriented, the interfacing FGF must move in only x direction until its second mating face is located on the plane with $N_b^k$ in the base coordinate frame. Thus, two unknowns, $P_{i,x}^B$ and $p_x$, can be calculated by the corresponding two equation in (1).

A metric for positioning mating faces is defined as below. Once positioning of a mating face is failed, a value less than 1.0 is assigned to degrade the INTERFACE_metric assigned to quantify interface-ability between FGFs in a chromosome. If it is successful, 1.0 is assigned to position metric for the mating.

$$\text{Pos\_metric}^k = \begin{cases} 1.0, & \text{if positioning is successful} \\ 0.5, & \text{if positioning is unsuccessful} \end{cases} \quad (i)$$

$$\text{Pos\_metric} = \frac{\sum_{j=1}^{nC_2}\left(\left(\sum_{k=1}^{m}\text{Pos\_metric}^k\right)/m\right)_j}{nC_2}$$

where k is $k^{th}$ pair of mating faces, j is $j^{th}$ pair of FGFs, m is the total number of mating pairs between two FGFs, and n is the number of FGFs.

It should be noted that the scaling operation has only been applied for some special cases as described herein. The first case is for a type of interface, 'tight-fits:assembly'. Once all the assembling operations by 'against' and 'fits' have been done, the algorithm checks the details of the 'fits'. If a 'fits' was 'tight-fits,' it scales the corresponding interfacing FGF in a base coordinate frame with a scaling factor, S=radius of base cylindrical face/radius of interfacing cylindrical face. The second case is 'against_equal:rigid attachment'. Though a shape deformation or optimization technique to match boundaries of the mating faces is not considered, a simple scaling for matching circular outer boundaries of two planar mating faces has been tested. It has been performed by additional concentric constraints and the scaling factor, S, the same for 'tight-fits'. The results of this operation will be shown in the section for application examples.

The automatic assembly methods proposed in coordinating, orienting, positioning operations are the bases to automatically assemble an interfacing FGF to a base FGF. Each method mainly outputs transformation matrices, a base coordinate frame and information of DOFs from the given inputs. The outputs of a method can provide information for inputs to another method. Because assembling operations must be performed following given types of interface in a chromosome, there should not be any discontinuity from outputs of a method to inputs of the other method for automating the assembling operations. All the cases of the information flow for 'against' and 'fits' have been considered, and then 10 methods have been made to be recursively used according to the input type of interface and DOFs. Table 7 summarizes all the methods.

Against:assembly or Fits:assembly{
   Coordinating
   Orienting
   Positioning
}

TABLE 7

Assembly methods and their output DOFs

| Assembly methods(DOFs) | Output DOFs | Conditions |
|---|---|---|
| Against:assembly($T_T(3)$, $T_R(3)$) coordinating, orienting, positioning | $T_T(2)$, $T_R(1)$ | Always successful |
| Against:assembly($T_T(2)$, $T_R(1)$) coordinating, orienting, positioning | $T_T(2)$, $T_R(1)$ | If the normal has the same direction as the axis of rotation |
| | $T_T(1)$, $T_R(0)$ | If the normal has a different direction from the axis of rotation |
| | Failed | Scaling/Stretching |
| Against:assembly($T_T(1)$, $T_R(0)$) coordinating, positioning | $T_T(1)$, $T_R(0)$ | If the mating face is parallel to the axis of translation |
| | $T_T(0)$, $T_R(0)$ | If the mating face is not parallel to the axis of translation |
| | Failed | Scaling/Stretching |
| Against:assembly($T_T(1)$, $T_R(1)$) coordinating, orienting, positioning | $T_T(1)$, $T_R(1)$ | If the normal has the same direction as the axis of rotation, and if the mating face is parallel to the axis of translation |
| | $T_T(0)$, $T_R(1)$ | If the normal has the same direction as the axis of rotation, and if the mating face is not parallel to the axis of translation |
| | $T_T(1)$, $T_R(0)$ | If the normal has a different direction from the axis of rotation, and if the mating face is parallel to the axis of translation |
| | $T_T(0)$, $T_R(0)$ | If this is not the cases above |
| | Failed | Scaling/Stretching |
| Against:assembly($T_T(0)$, $T_R(1)$) coordinating, orienting | $T_T(0)$, $T_R(1)$ | If the normal has the same direction as the axis of rotation |
| | $T_T(0)$, $T_R(0)$ | if the normal is different from the axis of rotation |
| | Failed | Scaling/Stretching |
| Fits:assembly($T_T(3)$, $T_R(3)$) coordinating, orienting, positioning | $T_T(1)$, $T_R(1)$ | Always successful |
| Fits:assembly($T_T(1)$, $T_R(1)$) coordinating, orienting, positioning | $T_T(1)$, $T_R(1)$ | If the centerline is the same as the axis of rotation, and parallel to the axis of translation |
| | $T_T(1)$, $T_R(0)$ | If the centerline is different from the axis of rotation, but parallel to the axis of translation |

TABLE 7-continued

Assembly methods and their output DOFs

| Assembly methods(DOFs) | Output DOFs | Conditions |
|---|---|---|
| | $T_T(0), T_R(1)$ | If the centerline is the same as the axis of rotation, but not parallel to the axis of translation |
| | $T_T(0), T_R(0)$ | If this is not the cases above |
| | Failed | Scaling/Stretching |
| Fits:assembly($T_T(1), T_R(0)$) coordinating, positioning | $T_T(1), T_R(0)$ | If the centerline is parallel to the axis of translation |
| | $T_T(0), T_R(0)$ | If the centerline is not parallel to the axis of translation |
| | Failed | Scaling/Stretching |
| Fits:assembly($T_T(2), T_R(1)$) coordinating, orienting, positioning | $T_T(0), T_R(1)$ | If the centerline is the same as the axis of rotation |
| | $T_T(1), T_R(0)$ | If the centerline is parallel to the axis of translation |
| | $T_T(0), T_R(0)$ | If this is not the cases above |
| | Failed | Scaling/Stretching |
| Fits:assembly($T_T(0), T_R(1)$) coordinating, orienting | $T_T(0), T_R(1)$ | If the centerline is the same as the axis of rotation |
| | $T_T(0), T_R(0)$ | If the centerline is different from the axis of rotation |
| | Failed | Scaling/Stretching |

An INTERFACE_metric for assembling FGFs based on a chromosome is calculated by:

INTERFACE_metric=$IT$_metric×$AF$_metric×Pos_metric.

The techniques described herein can generate many candidate shapes from input functional requirements defined through the V-model design process. Each candidate shape can be selected or discarded by the following three decision supportive data: (1) a value of FR_metric: 0.0~1.0; (2) a value of INTERFACE_metric: 0.0~1.0; and (3) a design matrix.

The values of FR_metric and INTERFACE_metric are can be automatically calculated (e.g. by a computer properly programmed to perform the techniques described herein along with the assembled candidate shape. Construction of a design matrix for each candidate shape must performed by the designer to check the independence axiom. This process is related to a change of dimensions of each FGF to satisfy the corresponding FR. The change of dimensions may result in a decoupled design matrix to guarantee satisfaction of all the FRs as explained above in connection with the hanger design example.

Figure 10:
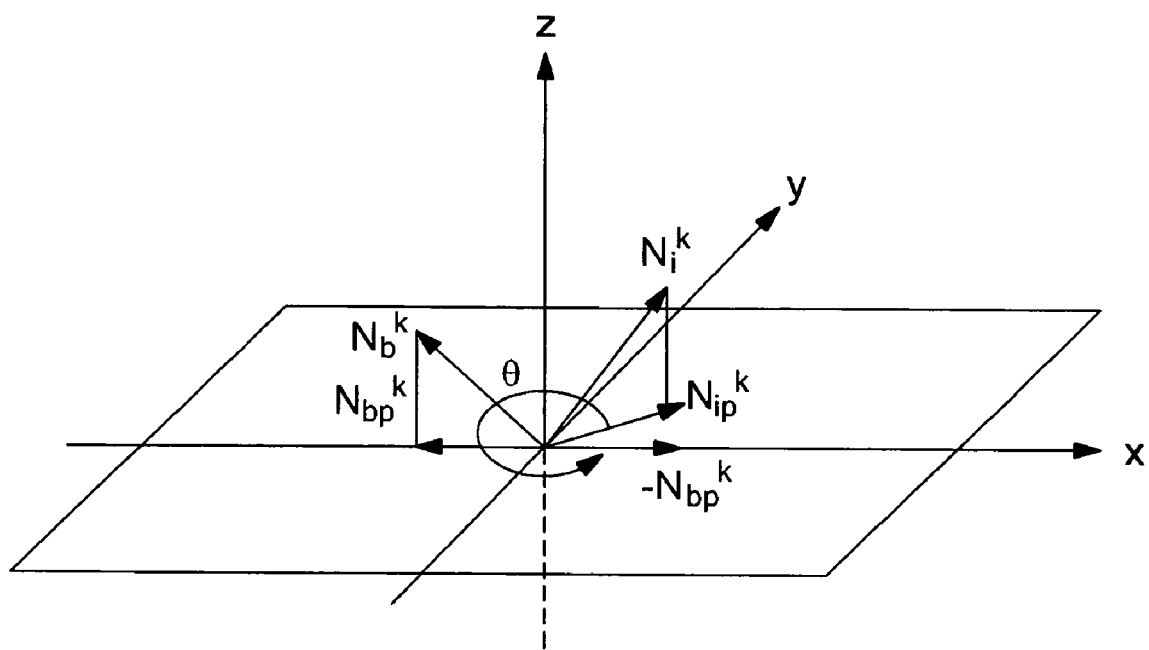
FIG. 10 is a coordinate system used to illustrate calculation of a rotational transformation matrix from input unit normal vectors and the rotation of an interfacing functional geometric feature.

Referring now to FIG. 10, FIG. 10 shows how orienting any ($T_R(1)$) calculates a rotational transformation matrix from input unit normal vectors and the rotation of the interfacing FGF. $N_b^k$ is a unit normal vector of $k^{th}$ mating face of base FGF and $N_i^k$ is that of interfacing FGF. Those two vectors are projected on the xy-plane and then normalized. The corresponding projected and normalized vector, $N_{ip}^k$, rotated until it is matched with $-N_{bp}^k$. Equations (h) calculate the rotational angle for $T_{Ri}^B$. This concept can be directly applied for 'against' and the projected normal vectors can be considered as normalized vectors from $C_{b2}$ to $C_{b1}$ and from $C_{i2}$ to $C_{i1}$ for 'fits'.

An AF metric measures the orient-ability of faces based on the angles between the faces. It quantifies the orient-ability by the following equations.

$$AF\_metric_p^k = \sum_{p=1}^{k-1}\left(1 - \frac{\sqrt{\min(angle_b - angle_i)^2}}{360}\right)_{pk}, \text{ if } k \geq 2$$

$$AF\_metric = \frac{\sum_{j=1}^{nC_2}\left(\sum_{k=2}^{m} AF\_metric_p^k\right)_j}{\sum_{j=1}^{nC_2}({}_mC_2)_j}$$

where k is $k^{th}$ pair of mating faces, j is $j^{th}$ pair of FGFs, m is the total number of pairs of mating faces between two FGFs, and n is the number of FGFs. In the AF_metric$_p^k$ for the $k^{th}$ pair of mating faces, angle$_b$ is an angle between two normal vectors of two mating faces on the base FGF, and angle$_i$ is an angle between two normals of the two mating faces on the interfacing FGF. Either angle can be calculated using the mathematical equations, angle$_b$=$\cos^{-1}(\hat{N}_b^p \cdot \hat{N}_b^k)$ and angle$_i$=$\cos^{-1}(\hat{N}_i^p \cdot \hat{N}_i^k)$, where $N_b$ is a unit normal of the base FGF and $N_i$ is a unit normal of the interfacing FGF. The arc cosine gives two values. Thus, the minimum value of (angle$_b$−angle$_i$) among the 4 combinations is selected in AF_metric, because it has been already rotated to the orientation in which the angle between both mating faces has been minimized. If it is 0°, orientations of both FGFs are completely matched. If k is greater than or equal to three, k−1 combinations, in which the given pair of mating faces is combined to already interfaced pairs, are checked to calculate and sum the scaled values from 0.0 to 1.0. The values of AF_metric$_p^k$ for $k^{th}$ pair are averaged to AF_metric for the given pair of interfacing FGFs as shown in the flow chart in FIGS. 9-9A.

Figure 11A:
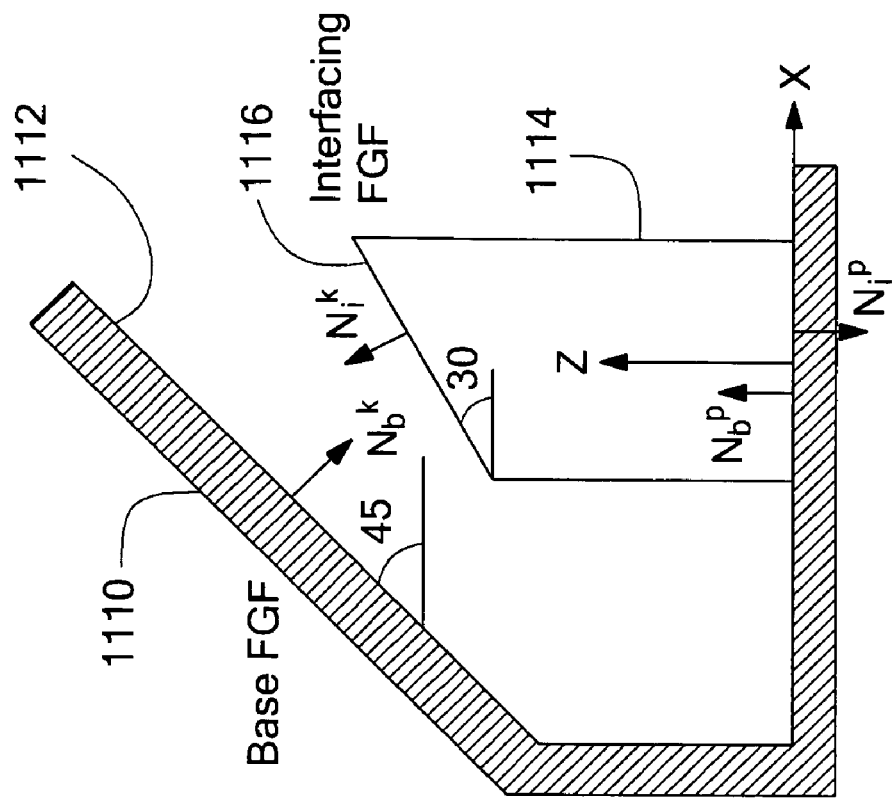
FIG. 11A is a side view of a surface of a functional geometric feature.
Figure 11:
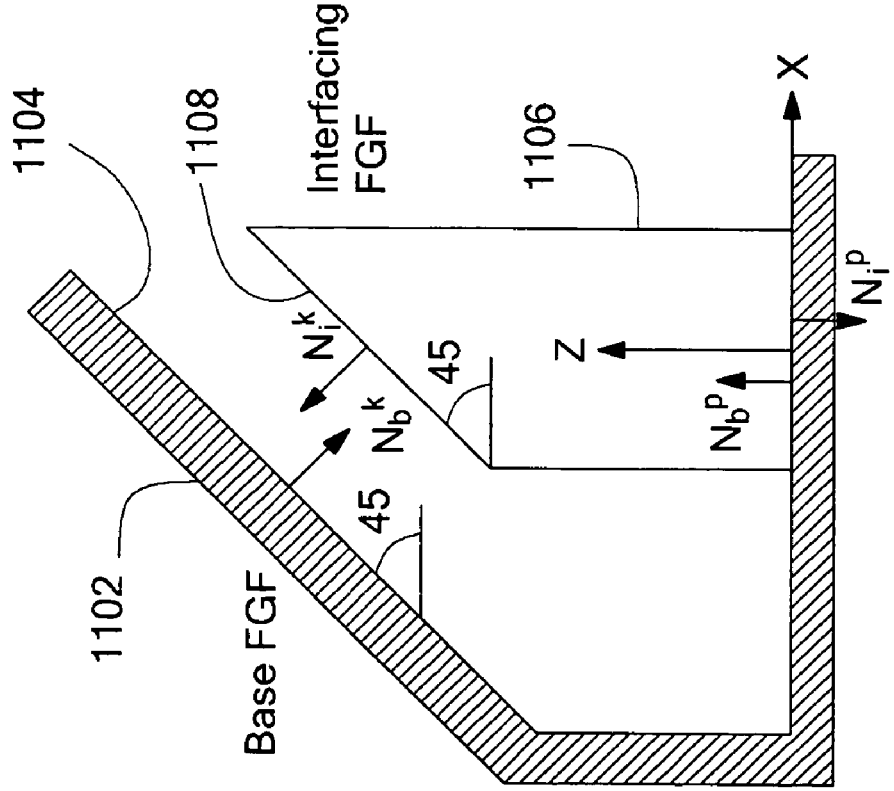
FIG. 11 is a side view of a surface of a functional geometric feature.

Referring now to FIGS. 11 and 11A, in which like elements are provided having like reference designations, a base FGF 1102 includes a first mating surface 1104. An interfacing FGF 1106 (i.e., FGF 1106 is intended to interface with base FGF 1102) has a mating surface 1108. As can be seen in FIG. 11, the surfaces 1104 and 1108 are provided such that they are well-aligned for mating.

The calculation of an AF_metric$_1^2$ for the mating faces 1104 and 1108 is shown below.

$\vec{N}_b^p=(0, 0, 1), \vec{N}_b^k=(1/\sqrt{2}, 0, -1/\sqrt{2})$ $\vec{N}_i^p=(0, 0, -1), \vec{N}_i^k=(-1/\sqrt{2}, 0, 1/\sqrt{2})$ angle$_b$=$\cos^{-1}(\vec{N}_b^p \cdot \vec{N}_b^q)$=135° or 225° angle$_i$=$\cos^{-1}(\vec{N}_i^p \cdot \vec{N}_i^q)$=135° or 225° min(angle$_b$−angle$_i$)=0°

$AF\_metric_1^2=1.0$

Its should be noted that the AF_metric value of 1.0 indicates that the surfaces 1104 and 1108 are well-aligned for mating.

In FIG. 11A, however, an interfacing FGF 1114 (i.e., FGF 1114 is intended to interface with base FGF 1110) has a mating surface 1116. As can be seen in FIG. 11A, the surfaces 1116 and 1112 are provided such that they are not well-aligned for mating. The calculation of an $AF\_metric_1^2$ for the mating faces 1104 and 1108 is shown below.

$$\vec{N}_b^p=(0,0,1), \vec{N}_b^k=(1/\sqrt{2}, 0, -1/\sqrt{2})$$

$$\vec{N}_i^p=(0,0,-1), \vec{N}_i^k=(-1/2,0,\sqrt{3}/2)$$

$$angle_b=\cos^{-1}(\vec{N}b^p * \vec{N}_b^q)=135° \text{ or } 225°$$

$$angle_i=\cos^{-1}(\vec{N}_b^p \cdot \vec{N}_b^p)=150° \text{ or } 210°$$

$$\min(angle_b - angle_i) = 15°$$

$$AF\_metric_1^2 = 0.96$$

Its should be noted that the AF_metric value of 0.96 indicates that the surfaces 1116 and 1112 are not as well-aligned for mating as surfaces 1104 and 1108 (FIG. 11).

Figure 12:
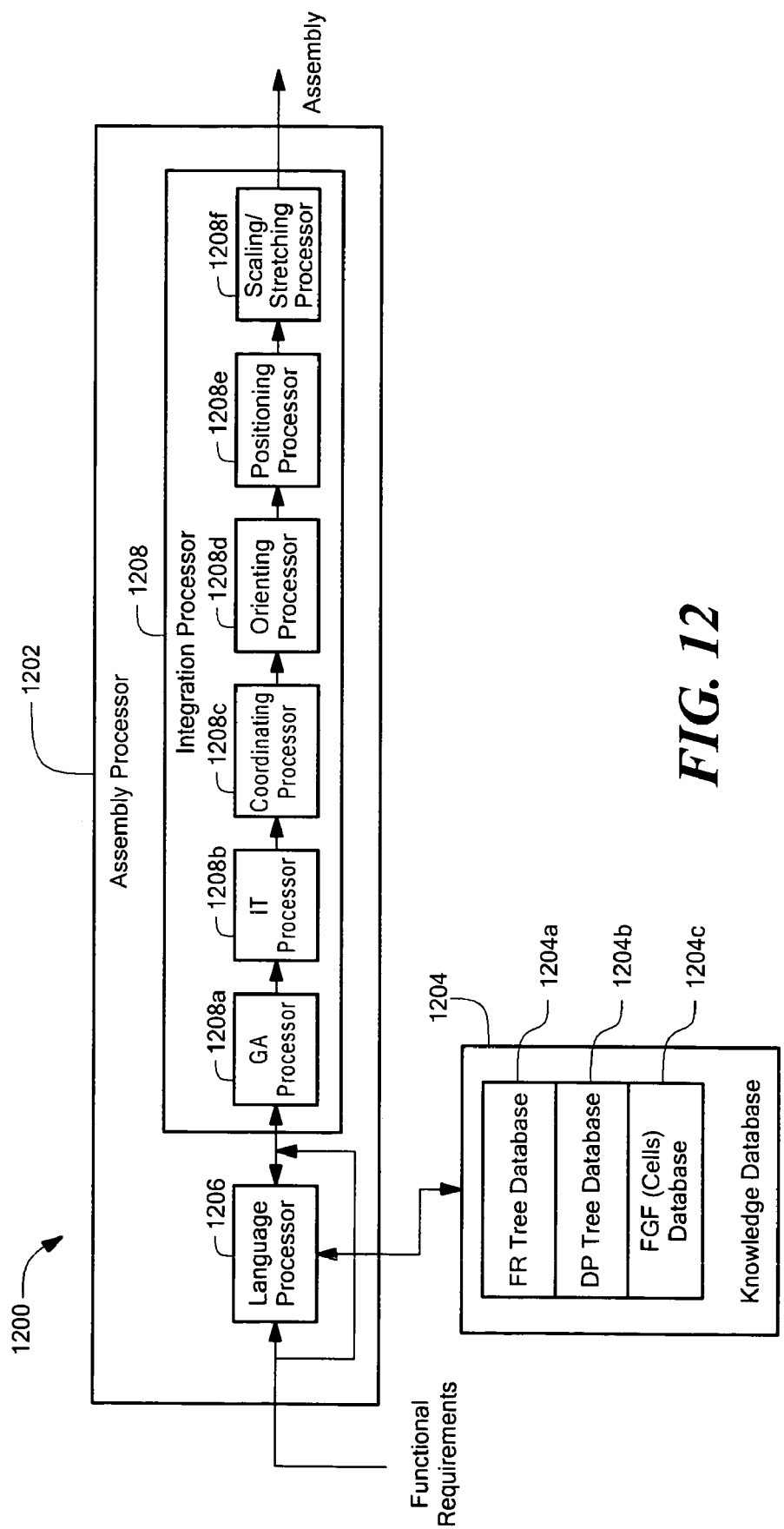
FIG. 12 is a block diagram of a system for designing mechanical objects.

Referring now to FIG. 12, a system 1200 for automatically generating assembled shapes from input functional descriptions includes an assembly processor 1202 having a knowledge database 1204 coupled thereto. Assembly processor 1202 includes a language processor 1206 adapted to couple to the knowledge database 1204 and also to receive functional requirements, design parameters, and functional geometric features for designing mechanical objects. The language processor 1206 is coupled to an integration processor 1208, which integrates the information provided thereto and provides a design for a mechanical object at an output thereof.

The integration processor 1208 includes a genetic algorithm processor 1208A coupled to the language processor 1206. The integration processor 1208 further includes an IT processor 1208B having an input coupled to the output of the GA processor 1208A and having an output coupled to an input of a coordinating processor 1208C. An output of the coordinating processor 1208c is coupled to an input of an orienting processor 1208d and output of the orienting processor 1208d is coupled to an input of a positioning processor 1208e. An output of the positioning processing 1208e is coupled an input of a scaling/stretching processor 1208f.

The knowledge database includes an FR tree database 1204a, a DP tree database 1204b and an FGF (cell) database 1204c. The knowledge base 1204 also has stored therein cells (cell name, interfaces), links between FGFs and cells, internal interface matches between lower-level FGFs for higher-level FGF and dangling interfaces of FGFs. It should be appreciated that collecting and including existing design knowledge in the knowledge base improves usefulness of the system.

The knowledge base also include integrations of the FRs, DPs and FGFs. Examples of integrations of FGFs are: FGF trees; internal interface matches between lower-level FGFs for higher-level FGF; dangling interfaces of FGFs, which have not been interfaced yet and will be interfaced with other FGFs.

Information on integrations of FRs and DPs can be retrieved from FR trees and DP trees. For example if FR0 has been searched, the following information can be retrieved from the knowledge base:

FR0
  FR1
  FR2
DP0
  DP1
  DP2

FGF0
  Dangling interface C1
  A set of lower-level FGFs: {FGF1, FGF2}; and
  Internal interface match: (A1:A2) and (B1:B2).

The FR_metric (which has a value which can range between 0.0 and 1.0) and INTERFACE_metric (which has a value which can range between 0.0 and 1.0) have been made to rank the generated shapes and to support decision-making by computer algorithms and/or human designers. The FR_metric is a language-matching rate between an input FR statement and a candidate FR statement. INTERFACE_metric (0.0~1.0) is an interface-matching rate (interface type and geometric assemble-ability) between candidate FGFs.

Computer implemented processes can be used to filter many of the generated shapes by first utilizing the values of the FR_metric first, and then by utilizing the values of the INTERFACE_metric. The candidate shapes with FR_metric =1.0 and INTERFACE_metric =1.0 can be considered as good design solutions among a lot of generated shapes. The design matrix must be constructed for each candidate shape to check satisfaction of all the FRs and finally to determine the best design solution.

This sort of shape generation using database is a combinatorial problem with a lot of combinations and high computational complexity. It has been recognized, in accordance with the invention that several important techniques can be used to handle the heavy computational load in a manageable level.

First, all the detailed geometry has been encapsulated. The developed computer algorithms use only geometric information on interfaces, i.e. mating faces. Thus, the number of combinations and computational complexity are relatively small comparing to other approaches using complex whole geometry.

Second, several modules of the computer algorithms have been used. The language-matching module reduces the solution space a lot in a certain level by FR_metric. The module of GA evolution reduces the solution space again by matching pre-defined interface-types between FGFs by IT_metric. Then, automatic assembling algorithm operates assembling of FGFs and calculates values of INTERFACE_ metric. Because solution spaces are reduced through the steps between the algorithms, computational complexity of automatic assembling algorithm is in a manageable level.

Third, bottom-up integrations of FGFs in top-down hierarchical tree can eliminate many combinations and reduce search space for allowable combinations comparing to integrations only by bottom-up manner.

For example, the methods and systems described herein demonstrate that a "functional CAD" can aid designers in generating conceptual design solutions from functional descriptions, in reusing existing CAD models, and in creating new designs as a base of "Thinking Design Machine".

Preferred systems can include a relatively large number of distributed databases of FGFs. Each of the databases can be generated from existing CAD models distributed over the world and can be used to update or provide databases for automatic candidate shape generation for conceptual design from functional descriptions through the Internet.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of computer aided design for designing a part, comprising:
    generating a functional geometric feature (FGF) hierarchy tree having two or more FGFs, wherein each of the two or more FGFs are associated with at least one functional requirement (FR);
    identifying interfaces associated with each of the two or more FGFs to provide identified interfaces;
    constructing one or more topologies of the part, wherein the topologies are associated with each of the two or more FGFs, by interfacing each of the two or more FGFs, wherein the one or more topologies correspond to design alternatives
    determining a final shape of the part from among the topologies that meets at least one of the at least one FR; and
    at least one of storing the final shape of the part in a computer readable storage medium or displaying the final shape of the part.

2. The method of claim 1, wherein identifying the interfaces includes identifying interfaces including at least one of a rigid interface, an against interface, a fits interface, a roll interface, a slide interface, a tight-fits interface, a coplanar interface, a face-edge interface, or edge-edge interface, and a face-vertex interface.

3. The method of claim 1, wherein each of the two or more FGFs is described as a text model having a description of at least one of an assembly, a solid, a face, an edge, or a vertex.

4. The method of claim 1, wherein the constructing one or more topologies includes:
    computing an interface-type metric associated with the two or more FGFs, wherein the interface-type metric is associated with a matching between the identified interfaces; and
    comparing the interface-type metric with an interface-type metric threshold.

5. The method of claim 1, wherein the constructing one or more topologies includes:
    computing an angle-of-face metric associated with the two or more FGFs, wherein the angle-of-face metric is associated with an angle between mating faces of the two or more FGFs; and
    comparing the angle-of-face metric to an angle-of-face-metric threshold.

6. The method of claim 1, wherein the constructing one or more topologies includes:
    computing a position metric associated with the two or more FGFs, wherein the position metric is associated with successful relative positioning of the two or more FGFs; and
    comparing the position metric to a position-metric threshold.

7. The method of claim 1, wherein the constructing one or more topologies includes:
    interfacing the two or more FGFs;
    computing an interface metric associated with the two or more FGFs, wherein the interface metric is associated with an interface-type metric, an angle-of-face metric, and a position metric, wherein the interface-type metric is associated with a matching between the identified interfaces, the angle-of-face metric is associated with an angle between mating faces of the two or more FGFs, and the position metric is associated with successful relative positioning of the two or more FGF; and
    comparing the interface metric to an interface-metric threshold.

8. The method of claim 1, wherein the constructing one or more topologies includes:
    providing one or more chromosomes with a genetic algorithm, wherein each chromosome is an arrangement of the two or more FGFs;
    assembling each of the one or more chromosomes by assembling the two or more FGFs;
    computing an interface metric associated with each of the one or more chromosomes, wherein the interface metric is associated with an interface-type metric, an angle-of-face metric, and a position metric, wherein the interface-type metric is associated with a matching between interfaces associated with the two or more FGFs, the angle-of-face metric is associated with an angle between mating faces of the two or more FGFs, and the position metric is associated with successful relative positioning of the two or more FGFs;
    comparing the interface metric for each of the one or more chromosomes to an interface-metric threshold; and
    providing a set of acceptable chromosomes from among the one ore more chromosomes.

9. The method of claim 1, wherein determining the final shape of the part includes:
    scaling or stretching at least one FGF associated with a topology having the two or more FGFs;
    computing an interface metric associated with the two or more FGFs, wherein the interface metric is associated with an interface-type metric, an angle-of-face metric, and a position metric, wherein the interface-type metric is associated with a matching between the identified interfaces, the angle-of-face metric is associated with an angle between mating faces of the two or more FGFs, and the position metric is associated with successful relative positioning of the two or more FGF; and
    comparing the interface metric to an interface-metric threshold.

10. The method of claim 1, further including:
    defining functional requirements (FRs);
    mapping the FRs to corresponding design parameters (DPs);
    decomposing the FRs and the corresponding DPs, thereby providing a design tree including decomposed FRs and decomposed DPs;
    generating geometric entities (GEs) associated with respective decomposed DPs, wherein the geometric entities each include one or more of a description of an edge, a vertex, or a face of a physical shape; and
    generating functional geometric features (FGFs) associated with respective GEs, wherein the FGFs each include at least one respective cell that can be described by at least one GE.

11. The method of claim 10, further including generating a knowledge database having the FRs, DPs and FGFs.

12. The method of claim 10, further including:
    constructing a design matrix to relate the FRs to the DPs; and analyzing the design matrix to determine a coupling between the FRs and the DPs.

13. The method of claim 10, wherein the decomposing provides one of decoupled and uncoupled FRs the DPs.

14. The method of claim 10, wherein the generating the geometric entities includes:
generating the geometric entities including at least one of a vertex, an edge, a face, a solid, or an assembly.

15. A computer-readable storage medium encoded with computer-readable code for performing computer aided design for designing a part, the medium comprising:
instructions for generating a functional geometric feature (FGF) hierarchy tree having two or more FGFs, wherein the two or more FGFs are associated with at least one functional requirement (FR);
instructions for identifying interfaces associated with the two or more FGFs to provide identified interfaces,
instructions for constructing one or more topologies of the part, wherein the topologies are associated with the two or more FGFs by interfacing the two or more FGFs, wherein the one or more topologies correspond to design alternatives; and
instructions for determining a final shape of the part from among the topologies that meets at least one of the at least one FR; and
instructions for at least one of storing the final shape of the part in a computer readable storage medium or displaying the final shape of the part.

16. The computer-readable storage medium of claim 15, further including instructions for computing at least one of an interface-type metric, an angle-of-face metric, or a position metric, wherein the interface-type metric is associated with a matching between the identified interfaces, the angle-of-face metric is associated with an angle between mating faces of the two or more FGFs, and the position metric is associated with successful relative positioning of the two or more FGF.

17. A method of computer aided design for designing a art, comprising:
providing a first functional requirement (FR);
searching a knowledge database with a language matching application capable of comparing the first FR to at least one FR within the knowledge database;
finding a second FR within the knowledge database in response to the searching, the second FR having a language match to the first FR, wherein the second FR is associated with at least one functional geometric feature (FGF) contained in the knowledge database;
determining a shape of the part in accordance with the at least one functional geometric feature (FGF) contained in the knowledge database; and
at least one of storing a shape of the part in a computer readable storage medium or displaying the shape of the part.

18. The method of claim 17, further including:
calculating a language matching parameter associated with the first and with the second FR; and
comparing the language matching parameter to a language matching parameter threshold.

19. The method of claim 17, further including:
identifying design parameters (DPs) and FGFs within the knowledge database associated with the second FR; and
generating an FR hierarchy tree, a DP hierarchy tree, and an FGF hierarchy tree.

20. The method of claim 19, further including:
constructing a design matrix associated with at least two FRs and at least two DPs within the FR hierarchy tree and the DP hierarchy tree respectively; and
analyzing the design matrix to determine a coupling between the at least two FRS and the at least two DPs.

21. A system for computer aided design for designing a part comprising:
a processor; and
a knowledge database coupled to the processor and having information stored therein, the information including functional requirements (FRs), design parameters (DPs) associated with the FRs, and functional geometric features (FGFs) associated with the DPs;
wherein the processor includes a language processor for providing a language match between a user supplied FR and an FR within the knowledge database; and
wherein the processor includes at least one of:
a language processor for providing a language match between a user supplied FR and an FR within the knowledge database having two or more FGFs,
a genetic algorithm (GA) processor coupled to the language processor for providing chromosomes as a combination of the two or more FGFs,
an interfaced type (IT) processor coupled to the GA processor for analyzing matches between types of interfaces associated with the two or more FGFs,
an orienting processor coupled to the IT processor for analyzing an angular match between faces of the two or more FGFs,
a positioning processor coupled to the orienting processor for analyzing an ability of the two or more FGFs to be relatively positioned, or
a scaling and stretching processor coupled to the positioning processor for scaling and stretching at least one of the two or more FGFs to achieve a best fit between the two or more FGFs.

* * * * *

UNITED STATES PATENT AND TRADEMARK OFFICE
CERTIFICATE OF CORRECTION

PATENT NO. : 7,295,958 B1
APPLICATION NO. : 10/454325
DATED : November 13, 2007
INVENTOR(S) : Suh et al.

It is certified that error appears in the above-identified patent and that said Letters Patent is hereby corrected as shown below:

Column 2, line 8 delete "purpose" and replace with --purposes--.

Column 3, line 23 delete "method" and replace with --methods--.

Column 4, line 27 delete "shown FIG. 3;" and replace with --shown in FIG. 3;--.

Column 5, line 7 delete "here in below." and replace with --hereinbelow--.

Column 5, lines 24-25 delete "should be" and replace with --should not be--.

Column 6, line 32 delete "two-dimensional" and replace with --a two-dimensional--.

Column 6, line 66 delete "At step 120 the" and replace with --At step 120, the--.

Column 7, line 63 delete " $Isys = \log_2 p_{\{m\}} - \sum_{i=1}^{m} \log_2 p_i, \text{ where } p_{\{m\}} = \prod_{i=1}^{m} p_i$ " and replace with -- $Isys = -\log_2 p_{\{m\}} - \sum_{i=1}^{m} \log_2 p_i, \text{ where } p_{\{m\}} = \prod_{i=1}^{m} p_i$ --.

Column 8, line 56 delete "FGFS" and replace with --FGFs--.

Column 8, line 62 delete "FGF_A" and replace with --FGF1_A--.

Column 8, line 64 delete "Here the" and replace with --Here, the--.

Column 10, line 35 delete "attribute Face type" and replace with --attribute Face_type--.

Column 10, line 44 delete "to interfaced" and replace with --to interface--.

Column 11, line 55 delete "column 508 the" and replace with --column 508, the--.

Column 11, line 57 delete "row an column" and replace with --row and column-- (check).

Column 11, line 58 delete "For example the" and replace with --For example, the--.

Column 12, line 35 delete "For example table" and replace with --For example, table--.

UNITED STATES PATENT AND TRADEMARK OFFICE
CERTIFICATE OF CORRECTION

PATENT NO. : 7,295,958 B1
APPLICATION NO. : 10/454325
DATED : November 13, 2007
INVENTOR(S) : Suh et al.

It is certified that error appears in the above-identified patent and that said Letters Patent is hereby corrected as shown below:

Column 12, line 43 delete "(of $Cell_1$ of FIG. 5)" and replace with --(of Cell_1 of FIG. 5)--.

Column 12, line 46 delete "(against:rigid_attachement)" and replace with --(against: rigid_attachment),--.

Column 12, line 48 delete "column" and replace with --columns--.

Column 12, line 50 delete ". For example FGF_1" and replace with --. For example, FGF_1--.

Column 12, line 52 delete "$FGF_1$," and replace with --FGF_1,--.

Column 13, line 32 delete "bee" and replace with --be--.

Column 13, line 34 delete "bee" and replace with --be--.

Column 13, line 36 delete "bee" and replace with --be--.

Column 14, line 8 delete "as" and replace with --as:--.

Column 14, line 52 delete "follow." and replace with --follows.--.

Column 14, line 54 delete "knowledgebase." and replace with --knowledge base.--.

Column 14, line 62 delete "as" and replace with --as:--.

Column 15, line 3 delete "as" and replace with --as:--.

Column 16, line 32 delete "that they these" and replace with --that these--.

Column 16, line 34 delete "...[{"DP1_A"}," and replace with --{"DP1_A",--.

Column 16, line 59 delete "diagrams," and replace with --diagram,--.

Column 16, line 66 delete "embodiment a" and replace with --embodiment, a--.

UNITED STATES PATENT AND TRADEMARK OFFICE
CERTIFICATE OF CORRECTION

PATENT NO. : 7,295,958 B1
APPLICATION NO. : 10/454325
DATED : November 13, 2007
INVENTOR(S) : Suh et al.

It is certified that error appears in the above-identified patent and that said Letters Patent is hereby corrected as shown below:

Column 17, line 35 delete "designer" and replace with --designers--.

Column 17, line 41 delete "as" and replace with --as:--.

Column 18, line 33 delete "(i.e., 20 Table 5" and replace with --(i.e., Table 5--.

Column 18, line 42 delete ". it" and replace with --. It--.

Column 18, line 58 delete "matched each" and replace with --matched to each--.

Column 18, line 58 delete "as" and replace with --as:--.

Column 19, line 12 delete "10.0." and replace with --1.0.--.

Column 19, line 18 delete "in step 908 the" and replace with --in step 908, the--.

Column 20, line 58 delete "FIG. FIGS 9 and 9A," and replace with --FIGS. 9 and 9A,--.

Column 21, line 10 delete "processing directly" and replace with --processing proceeds directly--.

Column 21, line 15 delete "facing" and replace with --faces--.

Column 21, line 53 delete "above described" and replace with --above-described--.

Column 21, line 54 delete ""positioning."" and replace with --"positioning"--.

Column 22, line 8 delete "$n_x o_x + n_y o_y n_2 o_2 = 0$" and replace with --$n_x o_x + n_y o_y + n_2 o_2 = 0$--.

Column 22, line 31 delete "is" and replace with --is:--.

Column 25, lines 9-10 delete "followings" and replace with --following--.

Column 25, line 23 delete " $\vec{P}_i^A = [T_{Ti}^A][T_{Ri}^A]\vec{P}_i^{Li}$ " and replace with -- $\vec{P}_i^A = [T_{Ti}^A][T_{Ri}^A]\vec{P}_i^{Li}(j)$ --.

UNITED STATES PATENT AND TRADEMARK OFFICE
CERTIFICATE OF CORRECTION

PATENT NO. : 7,295,958 B1
APPLICATION NO. : 10/454325
DATED : November 13, 2007
INVENTOR(S) : Suh et al.

It is certified that error appears in the above-identified patent and that said Letters Patent is hereby corrected as shown below:

Column 25, line 64 delete "Plan:" and replace with --Plane:--.

Column 26, line 65 delete " $\vec{P}_b{}^A$ " and replace with -- $\vec{P}_i{}^A$ --.

Column 29, lines 45-46 delete "are can be" and replace with --can be--.

Column 29, line 49 delete "must preformed" and replace with --must be preformed--.

Column 29, line 63 delete ", rotated" and replace with --, is rotated--.

Column 30, line 50 delete " $\vec{N}_b{}^P(0,0,1)$, $\vec{N}_b=(1/\sqrt{2}, 0,-1/\sqrt{2})$ " and replace with -- $\vec{N}_b{}^P(0,0,1)$, $\vec{N}_b^k=(1/\sqrt{2}, 0,-1/\sqrt{2})$ --.

Column 30, line 53 delete " $\vec{N}_{i}\,0,0,-1)$, $\vec{N}_i^k=(-1\sqrt{2}, 0, 1/\sqrt{2})$ " and replace with -- $\vec{N}_i^P;=(0,0,-1)$, $\vec{N}_i^k=(-1\sqrt{2}, 0, 1/\sqrt{2})$ --.

Column 30, line 62 delete "Its" and replace with --It--.

Column 31, line 11 delete " angle$_i$=cos$^{-1}$($\vec{N}_b{}^P \cdot \vec{N}_b{}^P$)=150° or 210° " and replace with -- angle$_i$= cos$^{-1}$($\vec{N}_i{}^P \cdot \vec{N}_i{}^a$)=150° or 210 --.

Column 31, line 16 delete "Its" and replace with --It--.

Column 31, line 47 delete "FGF" and replace with --FGFs--.

Column 31, line 51 delete "include" and replace with --includes--.

Column 31, line 54 delete "FGF;" and replace with --FGFs;--.

Column 32, line 31 delete "comparing" and replace with --compared--.

Column 32, line 38 delete ", automatic" and replace with --, an automatic--.

UNITED STATES PATENT AND TRADEMARK OFFICE
CERTIFICATE OF CORRECTION

| | |
|---|---|
| PATENT NO. | : 7,295,958 B1 |
| APPLICATION NO. | : 10/454325 |
| DATED | : November 13, 2007 |
| INVENTOR(S) | : Suh et al. |

It is certified that error appears in the above-identified patent and that said Letters Patent is hereby corrected as shown below:

Column 32, line 43 delete "in top-down" and replace with --in a top-down--.

Column 32, lines 58-59 delete "invention it" and replace with --invention, it--.

Column 33, line 3 delete "that that the" and replace with --that the--.

Column 33, line 22 delete "alternatives" and replace with --alternatives;--.

Column 34, line 6 delete "FGF;" and replace with --FGFs;--.

Column 34, line 44 delete "FGF;" and replace with --FGFs;--.

Column 35, line 37 delete "FGF." and replace with --FGFs.--.

Signed and Sealed this

Ninth Day of June, 2009

JOHN DOLL
*Acting Director of the United States Patent and Trademark Office*